(12) United States Patent
Rouhani et al.

(10) Patent No.: US 11,922,313 B2
(45) Date of Patent: Mar. 5, 2024

(54) PARTITIONED MACHINE LEARNING ARCHITECTURE

(71) Applicant: WILLIAM MARSH RICE UNIVERSITY, Houston, TX (US)

(72) Inventors: Bita Darvish Rouhani, San Diego, CA (US); Azalia Mirhoseini, Houston, TX (US); Farinaz Koushanfar, San Diego, CA (US)

(73) Assignee: WILLIAM MARSH RICE UNIVERSITY, Houston, TX (US)

( * ) Notice: Subject to any disclaimer, the term of this patent is extended or adjusted under 35 U.S.C. 154(b) by 0 days.

(21) Appl. No.: 16/077,395

(22) PCT Filed: Feb. 6, 2017

(86) PCT No.: PCT/US2017/016715
§ 371 (c)(1),
(2) Date: Aug. 10, 2018

(87) PCT Pub. No.: WO2017/176356
PCT Pub. Date: Oct. 12, 2017

(65) Prior Publication Data
US 2021/0295166 A1    Sep. 23, 2021

Related U.S. Application Data

(60) Provisional application No. 62/294,215, filed on Feb. 11, 2016.

(51) Int. Cl.
*G06N 3/084*    (2023.01)
*G06N 3/045*    (2023.01)

(52) U.S. Cl.
CPC .............. *G06N 3/084* (2013.01); *G06N 3/045* (2023.01)

(58) Field of Classification Search
None
See application file for complete search history.

(56) References Cited

U.S. PATENT DOCUMENTS

| 2014/0358830 A1 | 12/2014 | Chiang et al. |
| 2014/0364966 A1 | 12/2014 | Matsuoka et al. |
| 2015/0193695 A1 | 7/2015 | Cruz Mota et al. |

(Continued)

OTHER PUBLICATIONS

Que, A Collaborative Framework for Distributed Privacy-Preserving Support Vector Machine Learning, AMIA Annual Symposium Proceedings, 2012 (Year: 2012).*

(Continued)

*Primary Examiner* — Kakali Chaki
*Assistant Examiner* — Shien Ming Chou
(74) *Attorney, Agent, or Firm* — Mintz Levin Cohn Ferris Glovsky and Popeo, P.C.

(57) ABSTRACT

A system may include a processor and a memory. The memory may include program code that provides operations when executed by the processor. The operations may include: partitioning, based at least on a resource constraint of a platform, a global machine learning model into a plurality of local machine learning models; transforming training data to at least conform to the resource constraint of the platform; and training the global machine learning model by at least processing, at the platform, the transformed training data with a first of the plurality of local machine learning models.

20 Claims, 8 Drawing Sheets

(56) References Cited

U.S. PATENT DOCUMENTS

| | | |
|---|---|---|
| 2015/0227838 A1 | 8/2015 | Wang et al. |
| 2015/0242741 A1 | 8/2015 | Campos et al. |
| 2015/0254575 A1 | 9/2015 | Nere et al. |
| 2016/0078361 A1 | 3/2016 | Brueckner et al. |

OTHER PUBLICATIONS

Wiering, The Neural Support Vector Machine, In Proceeding of the 25th Benelux Artificial Intelligence Conference BNAIC, 2013 (Year: 2013).*

Grau, Parallel Computing for Neural Networks, Rochester Institute of Technology RIT, EECC756 Course Slide, http://meseec.ce.rit.edu/756-projects/spring2013/1-4.pdf, 2013 (Year: 2013).*

Sudhakar Efficient Mapping of Backpropagation Algorithm onto a Network of Workstations, IEEE Transaction on System Man and Cybernetics, 1998 (Year: 1998).*

Dean, Large Scale Distributed Deep Networks NIPS 12 Proceedings of the 25th International Conference on Neural Information Processing Systems, Dec. 2012 (Year: 2012).*

Sorzano, A Survey of Dimensionality Reduction Technique, arXiv, 2014 (Year: 2014).*

Bhuiyan, How do I know when to stop training a neural network, Research Gate, 2015 (Year: 2015).*

Chen Revisiting Distributed Synchronous SGD, arXiv, 2016 (Year: 2016).*

Kulkarni, Novel Ensemble Neural Network Models for better Prediction using Variable Input Approach, International Journal of Computer Applications, vol. 39—No. 18. 2012 (Year: 2012).*

Dean et al., "Large Scale Distributed Deep Networks", NIPS 12 Proceedings of the 25th International Conference on Neural Information Processing Systems, Dec. 2012 (Year: 2012).*

Hinton et al., "Dropout: A Simple Way to Prevent Neural Networks from Overfitting", Journal of Machine Learning Research 15, 2014 (Year: 2014).*

Lee et al., "Why M Heads are Better than One: Training a Diverse Ensemble of Deep Networks", arXiv, 2015 (Year: 2015).*

Que, Jialan, et al., "A collaborative framework for distributed privacy-preserving support vector machine learning," *AMIA Annual Symposium Proceedings*. American Medical Informatics Association, pp. 1350-1359, 2012.

Bergstra, J. et al., "Theano: a cpu and gpu math expression compiler," in *Proceedings of the Python for scientific computing conference (SciPy)*, vol. 4. Austin, TX, 2010, p. 3.

Clarkson, K. L. et al., "Numerical linear algebra in the streaming model," in *Proceedings of the forty-first annual ACM symposium on Theory of computing*. ACM, 2009, pp. 205214.

Consolvo, S. et al., "Activity sensing in the wild: a field trial of ubi-fit garden," in *Proceedings of the SIGCHI Conference on Human Factors in Computing Systems*. ACM, 2008, pp. 1797-1806.

Deng, L. et al., "Deep learning: methods and applications," *Foundations and Trends® in Signal Processing*, vol. 7, No. 3-4, pp. 197-387, 2014.

Deng, L. et al., "Recent advances in deep learning for speech research at microsoft," in *Acoustics, Speech and Signal Processing (ICASSP), 2013 IEEE International Conference on*. IEEE, 2013, pp. 8604-8608.

Drineas, P. et al., "On the nystrom method for approximating a gram matrix for improved kernel-based learning," *The Journal of Machine Learning Research*, vol. 6, pp. 2153-2175, 2005.

Dyer, E. L. et al., "Greedy feature selection for subspace clustering," *The Journal of Machine Learning Research*, vol. 14, No. 1, pp. 2487-2517, 2013.

Hinton, G. E. et al., "Reducing the dimensionality of data with neural networks," *Science*, vol. 313, No. 5786, pp. 504-507, 2006. https://developer.nvidia.com/jetson-tk1, 2015.

Journee, M. et al., "Generalized power method for sparse principal component analysis," *The Journal of Machine Learning Research*, vol. 11, pp. 517-553, 2010.

Lane, N. D. et al., "Can deep learning revolutionize mobile sensing?" in *Proceedings of the 16th International Workshop on Mobile Computing Systems and Applications*. ACM, 2015, pp. 117-122.

Le, Q. V. "Building high-level features using large scale unsupervised learning," in *Acoustics, Speech and Signal Processing (ICASSP), 2013 IEEE International Conference on*. IEEE, 2013, pp. 8595-8598.

Liu, Y. et al., "High dimensionality reduction using cur matrix decomposition and auto-encoder for web image classification," in *Advances in Multimedia Information Processing—PCM 2010*. Springer, 2010, pp. 1-12.

Mahoney, M. W. et al., "Cur matrix decompositions for improved data analysis," *Proceedings of the National Academy of Sciences*, vol. 106, No. 3, pp. 697-702, 2009.

Miluzzo, E. et al., "Sensing meets mobile social networks: the design, implementation and evaluation of the cenceme application," in *Proceedings of the 6th ACM conference on Embedded network sensor systems*. ACM, 2008, pp. 337-350.

Mirhoseini, A. et al., "Rankmap: A platform-aware framework for distributed learning from dense datasets," *arXiv preprint arXiv:1503.08169*, 2015.

Mun, M. et al., "Peir, the personal environmental impact report, as a platform for participatory sensing systems research," in *Proceedings of the 7th international conference on Mobile systems, applications, and services*. ACM, 2009, pp. 55-68.

Pati, Y. C. et al., "Orthogonal matching pursuit: Recursive function approximation with applications to wavelet decomposition," in *Signals, Systems and Computers, 1993. 1993 Conference Record of The Twenty-Seventh Asilomar Conference on*. IEEE, 1993, pp. 40-44.

Ploetz, T. et al., "Feature learning for activity recognition in ubiquitous computing," in *IJCAI Proceedings—International Joint Conference on Artificial Intelligence*, vol. 22, No. 1, 2011, p. 1729.

Reddy, S. et al., "Using mobile phones to determine transportation modes," *ACM Transactions on Sensor Networks (TOSN)*, vol. 6, No. 2, p. 13, 2010.

Srivastava, N. et al., "Dropout: A simple way to prevent neural networks from overfitting, "The Journal of Machine Learning Research, vol. 15, No. 1, pp. 1929-1958, 2014.

Sutskever, I. et al., "On the importance of initialization and momentum in deep learning," in *Proceedings of the 30th international conference on machine learning(ICML-13)*, 2013, pp. 1139-1147.

Thiagarajan, A. et al., "Vtrack: accurate, energy-aware road traffic delay estimation using mobile phones," in *Proceedings of the 7th ACM Conference on Embedded Networked Sensor Systems*. ACM, 2009, pp. 85-98.

"UCI machine learning repository," https://archive.ics.uci.edu/mi/datasets/Daily+and+Sports+Activities, accessed: 2015.

"UCI machine learning repository," https://archive.ics.uci.edu/ml/datasets/ISOLET, accessed: 2015.

"UCI machine learning repository," https://archi-ve.ics.uci.edu/ml/datasets/UJTIndoorLoc, accessed: 2015.

Wang, Y. et al., "Tracking human queues using single-point signal monitoring," in *Proceedings of the 12th annual international conference on Mobile systems, applications, and services*. ACM, 2014, pp. 42-54.

* cited by examiner

PARTITIONED MACHINE LEARNING ARCHITECTURE

CROSS REFERENCE TO RELATED APPLICATIONS

This application is a national-phase entry of Patent Cooperation Treaty Application No. PCT/US2017/016715 filed Feb. 6, 2017, entitled "PARTITIONED MACHINE LEARNING ARCHITECTURE," which claims the benefit of priority to U.S. Provisional Application No. 62/294,215 entitled MOBIDEEP: MAKING SENSE OF MOBILE CONTEXT BY MACHINE LEARNING and filed on Feb. 11, 2016, the disclosure of which is incorporated herein by reference in its entirety.

STATEMENT OF GOVERNMENT RIGHTS

Certain aspects of the present disclosure were developed with U.S. Government support under Grant No. ONR-N00014-11-1-0885 awarded by the Office of Naval Research. The U.S. Government has certain rights in the subject matter of the present disclosure.

TECHNICAL FIELD

The subject matter described herein relates generally to machine learning and more specifically to a partitioned machine learning architecture.

BACKGROUND

Machine learning models may be trained to perform a variety of cognitive tasks including, for example, object identification, natural language processing, information retrieval, and speech recognition. In particular, deep learning models (e.g., neural networks, belief networks, restricted Boltzmann machines, and/or the like) may be especially adept at providing accurate inferences for a variety of complex user behavior. These inferences may be based on data collected by sensors (e.g., biometric readers, accelerometers, gyroscopes, microphones, cameras, and/or the like) embedded in portable platforms including, for example, drones, robots, smartphones, tablet personal computers (PCs), and wearable devices (e.g., smart watches, fitness trackers, and/or the like).

SUMMARY

Systems, methods, and articles of manufacture, including computer program products, are provided for a partitioned machine learning architecture. In some example embodiments, there is provided a system that includes at least one processor and at least one memory. The at least one memory may include program code that provides operations when executed by the at least one processor. The operations may include: partitioning, based at least on a resource constraint of a platform, a global machine learning model into a plurality of local machine learning models; transforming training data to at least conform to the resource constraint of the platform; and training the global machine learning model by at least processing, at the platform, the transformed training data with a first of the plurality of local machine learning models.

In some variations, one or more features disclosed herein including the following features can optionally be included in any feasible combination. The system may be further configured to: backward propagate an error in an output of the processing of the transformed training data with the first local machine learning model, the error being backward propagated through the first local machine learning model; and minimize the error by at least adjusting a parameter applied by the first local machine learning model. A corresponding parameter at the global machine learning model may be updated based at least on the adjusting of the parameter at the first local machine learning model. A frequency of updating the corresponding parameter at the global machine learning model may be adjusted. The frequency may be adjusted based at least on a communication cost of the updating and a computation cost of having a stale parameter at the global machine learning model.

In some variations, the transforming of the training data may include reducing a dimensionality of the training data. The reducing of the dimensionality of the training data may include factorizing the training data into a corresponding dictionary and a plurality of encodings, the plurality of encodings having a lower dimension than the training data. The training of the global machine learning model may further include processing a first of the plurality of encodings and a second of the plurality of encodings. The first encoding may be processed in parallel with the second encoding, when the resource constraint of the platform enables the first encoding to be processed in parallel at the platform with the second encoding.

In some variations, the training of the global machine learning model may further include processing the transformed training data with a second of the plurality of local machine learning models. The transformed training data may be processed, at the platform, with the first local machine learning model and with the second local machine learning model in parallel, when the resource constraint of the platform enables the transformed training data to be processed in parallel at the platform with the first local machine learning model and with the second local machine learning model. Alternately and/or additionally, the transformed training data may be processed with the first local machine learning model at the platform and with the second local machine learning model at another platform, the transformed training data being processed at the platform and at the other platform in parallel. Alternately and/or additionally, the transformed training data may be processed, at the platform, with the first local machine learning model and with the second local machine learning model in sequence, when the resource constraint of the platform enables the transformed training data to be processed sequentially at the platform with the first local machine learning model and with the second local machine learning model.

In some variations, the system may be further configured to: determine whether the global machine learning model has achieved convergence; and continue to train the global machine learning model, when the global machine learning is determined to not have achieved convergence. Alternately and/or additionally, the system may be configured to: determine whether the global machine learning model has been subject to a threshold number of training iterations; and continue to train the global machine learning model, when the global machine learning model is determined to not have been subject to the threshold number of training iterations.

In some variations, the resource constraint may be a memory constraint, a processor constraint, and/or a bandwidth constraint. The global machine learning model may be a first neural network having a plurality of neurons and interconnections while the first local machine learning model may be a second neural network having a subset of the plurality of neurons and interconnections of the first neural network. The first neural network may be partitioned depth first, and the second neural network may include a same number of layers as the first neural network. The depth first partitioning of the first neural network enables the transformed training data to be processed at least a second time with the first local machine learning model prior to updating the global machine learning model.

In some variations, the platform may be a drone, a robot, a smartphone, a tablet personal computer, and/or a wearable device. The system may be further configured to determine the resource constraint of the platform.

In some example embodiments, there is provided a system that includes at least one processor and at least one memory. The at least one memory may include program code that provides operations when executed by the at least one processor. The operations may include: partitioning, based at least on a resource constraint of a platform, a global machine learning model into a plurality of local machine learning models; transforming input data to at least conform to the resource constraint of the platform; and executing the global machine learning model by at least processing, at the platform, the transformed input data with a first of the plurality of local machine learning models. In some variations, the system may be further configured to determine the resource constraint of the platform.

In some variations, the executing of the global machine learning model may further include processing the transformed input data with a second of the plurality of local machine learning models. The transformed input data may be processed, at the platform, with the first local machine learning model and with the second local machine learning model in parallel, when the resource constraint of the platform enables the transformed input data to be processed in parallel at the platform with the first local machine learning model and with the second local machine learning model. Alternately and/or additionally, the transformed input data may be processed with the first local machine learning model at the platform and with the second local machine learning model at another platform, the transformed input data being processed at the platform and at the other platform in parallel. Alternately and/or additionally, the transformed input data may be processed with the first local machine learning model and with the second local machine learning model in sequence, when the resource constraint of the platform enables the transformed input data to be processed sequentially at the platform with the first local machine learning model and with the second local machine learning model.

In some variations, the input data may include sensor data collected at the platform. The platform may be a drone, a robot, a smartphone, a tablet personal computer, and/or a wearable device.

In some variations, the transforming of the input data may include reducing a dimensionality of the input data. The reducing of the dimensionality of the input data may include factorizing the input data into a corresponding dictionary and a plurality of encodings, the plurality of encodings having a lower dimension than the input data. The executing of the global machine learning model may further include processing a first of the plurality of encodings and a second of the plurality of encodings. The first encoding may be processed in parallel with the second encodings, when the resource constraint of the platform enables the first encoding to be processed in parallel at the platform with the second encoding.

In some variations, the resource constraint comprises a memory constraint, a processor constraint, and/or a bandwidth constraint. The global machine learning model may be a first neural network having a plurality of neurons and interconnections while the first local machine learning model may be a second neural network having a subset of the plurality of neurons and interconnections of the first neural network. The first neural network may be partitioned depth first and the second neural network may include a same number of layers as the first neural network.

In some example embodiments, there is provided a method. The method may include: receiving a stream of training samples, wherein each of the training samples is a vector comprising a plurality of values for a respective plurality of features; for each training sample: computing a projection error for the training sample relative to a column space of a current dictionary matrix; when the projection error is greater than an error threshold, concatenating a scaled version of the training sample to the current dictionary matrix; and generating a transformed training sample based on the training sample and the current dictionary matrix, wherein the transformed sample is k-sparse; and training a learning algorithm using a plurality of the transformed samples and a respective plurality of training labels to obtain values of parameters of the learning algorithm.

In some variations, the learning algorithm may be a machine learning algorithm. The method may further include storing the values of the parameters in a memory.

In some variations, after having trained the learning algorithm, the current dictionary matrix may be used to project an operational sample onto a k-dimensional subspace of the column space of the current dictionary matrix and the projected operational sample may be submitted to the learning algorithm to determine an inference label that identifies an object from a set of objects.

In some variations, the method may include: receiving an operational sample; generating a transformed operational sample based on the operational sample and the current dictionary matrix, wherein the transformed operational sample is k-sparse; and after having performed the training of the learning algorithm, executing the learning algorithm on the transformed operational sample using the parameter values to obtain an inference label.

In some variations, the interference label may identify: an object from a set of objects; a category from a set of categories; an integer from a set of integers; a person from a set of persons; a language from a set of languages; a letter from an alphabet; a physical activity from a set of activities; a location from a set of locations; a computer from a set of computers; a direction from a set of directions; a diagnosis from a set of medical diagnoses; and/or a grade from a set of grades for an educational assessment.

In some variations, the method may include outputting an indication of the inference label via an output device. The method may further include performing, based at least on the inference label, one or more of the following: directing a robot to perform an action corresponding to the inference label; determining whether to allow a client computer to gain access to a network based on the inference label; transmitting a message whose content depends on the inference label; determining whether to initiate a financial transaction based on the inference label; locating a person or object based on the inference label; concatenating a letter of an alphabet to a text, as part of a handwriting recognition task; and concatenating a word or phoneme to a text, as part of a voice recognition task.

In some variations, the learning algorithm may be a neural network or a restricted Boltzmann machine or a belief network. The learning algorithm may be a neural network with three or more layers, the number of nodes in a first of the layers being equal to a number of components in each transformed training sample. The learning task may be an inference task or classification task.

In some variations, the method may be performed on a robot, a mobile device, a wearable device, a tablet computer, a laptop computer, a desktop computer, and/or a computer implanted in a living organism. When the projection error is less than or equal to the error threshold, the generating of a transformed sample may include performing orthogonal matching pursuit on the input sample based on the current dictionary matrix and the sparsity level k. Alternately and/or additionally, when the projection error is greater than the error threshold, the generating of a transformed sample may include generating a vector having a single non-zero entry, a position index of the single non-zero entry within the vector corresponding to a position index of the scaled version with the current dictionary matrix. The number of samples in the dictionary matrix may be constrained to be no greater than l, each transformed training sample having l components and l being smaller than the number m of features in the plurality of features. The respective values of l and/or k may be selected based on a set of user-defined constraints and/or platform-specific constraints. The value of l may be adaptively tuned with respect to the number m and the available memory of a target platform. The value of k may be selected based on a minimization of inference error using a subset of the training samples of the stream. The generating of a transformed training sample may include generating a projection of the training sample into a k-dimensional subspace of the column space of the current dictionary matrix. The feature values in each training sample may be obtained by a set of one or more sensors.

In some example embodiments, there is provided a method. The method may include: selecting preprocessing parameters based on user constraints and/or physical constraints of the target platform, wherein the preprocessing parameters include one or more of the following: a sparsity level k to which raw data samples are to be projected relative to a dictionary; a maximum number of features in each projected sample that results from the projection of the raw data samples or a maximum number of columns allowed in the dictionary; storing the preprocessing parameter in a memory of the target platform to at least enable the target platform to perform the training and/or execution of the learning algorithm.

In some variations, the learning algorithm may be a machine learning algorithm. The user constraints may include a user-defined runtime budget. The user constraints may include a user specified threshold for projection error. The physical constraints may include a maximum memory footprint, a maximum energy consumption, a maximum power dissipation, a maximum runtime; and/or a maximum processing capacity.

In some variations, the learning algorithm may be a neural network, a number of units in an initial layer of the neural network being equal to l. The sparsity level k may be selected to reduce an estimated inference error of the learning algorithm. The estimate inference error of the learning algorithm may be determined based on a subset of available training samples and not the entire set of training samples. The selecting and the storing may be performed by the target platform.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1A:
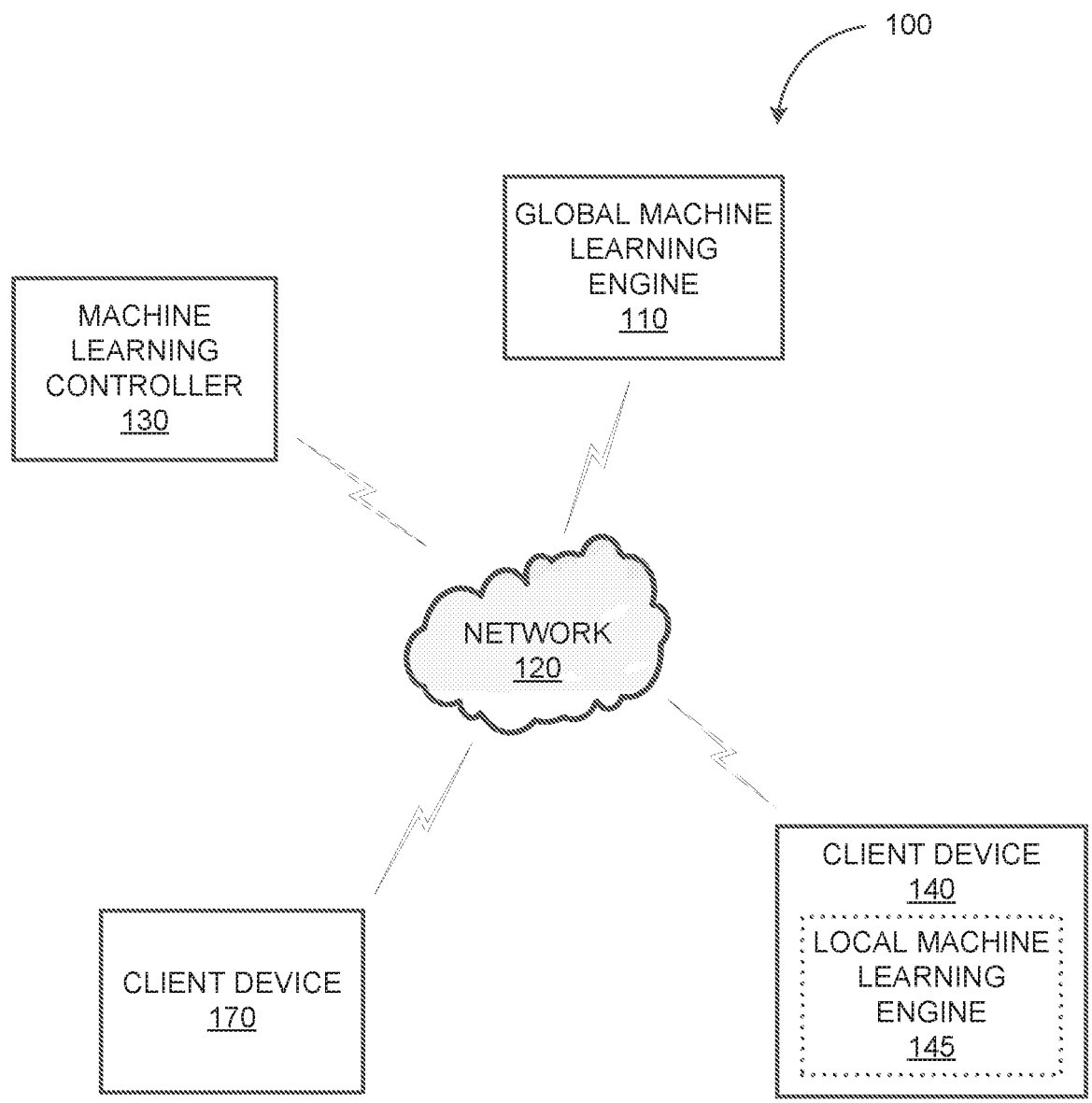
FIG. 1A depicts a network diagram illustrating a network environment, in accordance with some example embodiments.

Machine learning models (e.g., deep learning models) may be used to analyze raw data (e.g., collected by sensors) in order to perform a variety of cognitive tasks including, for example, classification, feature extraction, pattern recognition, and regression. However, machine learning models are typically associated with high resource overhead (e.g., memory, processor, bandwidth, and/or the like), which prevents the machine learning models from being implemented on platforms having limited resources. In particular, the resource overhead associated with training and executing a deep learning model (e.g., neural networks, belief networks, restricted Boltzmann machines, and/or the like) tends to exceed the capacity of portable platforms such as, for example, drones, robots, smartphones, tablet personal computers, and wearable devices. As such, the training and execution of the machine learning model must be offloaded to a remote cloud platform where resources may be more abundant. But offloading the training and the execution of the machine learning model to a remote cloud platform may incur significant communication overhead and may compromise the security of the data from the portable platform.

In some example embodiments, a global machine learning model may be a deep learning model (e.g., neural networks, belief networks, restricted Boltzmann machines, and/or the like) imposing high resource overhead that exceeds the capacity of a client device. The client device may be a portable platform (e.g., a drone, robot, smartphone, tablet personal computer, wearable device, and/or the like) having limited resources. As such, the global machine learning model may be partitioned into a plurality of local machine learning models in accordance with the resource constraints (e.g., memory, processor, bandwidth, and/or the like) of the client device such that the client device may have sufficient resources to support the training and/or execution of the individual local machine learning models. For instance, each local machine learning model may have a subset of the neurons and corresponding interconnections that are present in the global machine learning model. Meanwhile, the global machine learning model may be trained and/or executed by at least training and/or executing the plurality of local machine learning models deployed at the client device.

In some example embodiments, a plurality of local machine learning models may be trained and/or executed at the client device by at least processing (e.g., forward propagating) data through the local machine learning models. This data may include raw data collected by one or more sensors (e.g., biometric readers, accelerometers, gyroscopes, microphones, cameras) embedded at the client device. According to some example embodiments, raw data (e.g., collected by the sensors) may be high-dimensional data that spans a large feature space. Thus, this data may be preprocessed in order to enable a subsequent processing of the data by the local machine learning models at the client device. For instance, the dimensionality of the data may be reduced by at least transforming the high-dimensional data into an ensemble of lower-dimensional subspaces that match the size of the local machine learning model.

In some example embodiments, a global machine learning model may be partitioned depth first in order to form a plurality of local machine learning models. Each of the plurality of local machine learning models may have fewer neurons and interconnections than the global machine learning model. However, each of the plurality of local machine learning models may have a same depth as the global machine learning model. According to some example embodiments, updates to the local machine learning models (e.g., at a client device) may be propagated to the global machine learning model. For instance, the plurality of local machine learning models may be trained individually at a client device, thereby changing at least some of the local parameters (e.g., weights, biases, and/or the like) at the local machine learning models. As such, global parameters (e.g., weights, biases, and/or the like) at the global machine learning model may be updated based on the corresponding local parameters (e.g., weights, biases, and/or the like) at the local machine learning models.

In some example embodiments, partitioning the global machine learning model depth first instead of breadth first may obviate a constant updating of the global machine learning model. For instance, a global machine learning model that is partitioned breadth first may require an update for each training iteration performed at a corresponding local machine learning model. By contrast, when a global machine learning model is partitioned depth first, a corresponding local machine learning model may be subject to multiple training iterations (e.g., with the same and/or different training data) before any updates is propagated to the global machine learning model. Thus, a depth first partitioning scheme may minimize the communication cost associated with a partitioned machine learning architecture.

In some example embodiments, the partitioning of a global machine learning model may significantly compress the size of the machine learning model while minimally affecting the inference accuracy, thereby enabling efficient realization of learning and sensing applications on resource constrained platforms (e.g., portable platforms). The partitioning of the global machine learning model further enables on-the-fly updates to the global machine learning model as the corresponding local machine learning models may be trained (e.g., with new and/or additional training data) as needed. Meanwhile, the preprocessing of raw data, which may transform high-dimensional data into a plurality of lower-dimensional encodings of the high-dimensional data, may further increase the efficiency of the subsequent processing of the data (e.g., by machine learning models) particularly in terms of memory footprint, power, energy, and runtime. Given the rich set of embedded sensors in today's electronic devices and the great promise of deep learning, the ability to locally learn and infer sensing data (e.g., at resource constrained platforms) undoubtedly enables developing an enormous number of new applications across a variety of domains, including health-care, social networks, environmental monitoring, and transportation.

In some example embodiments, the preprocessing of raw data (e.g., collected at a portable platform) may further preserve the privacy of the raw data, particularly in the Internet-of-Things (IoT) era. For instance, raw data collected by a smartphone may be preprocessed such that only the corresponding encodings are dispatched to other devices such as, for example, laptops, tablet personal computers, smartwatches, and/or other smartphones. These encodings may be used in training the other devices. Moreover, by disseminating data in this manner, boosting algorithms (e.g., Adaboost, Bagging, and/or the like) may be used to harness the wisdom of the crowd and mitigate the sensitivity of the inference accuracy associated with a specific machine learning topology.

FIG. 1A depicts a network diagram illustrating a network environment 100, in accordance with some example embodiments. Referring to FIG. 1A, a global machine learning engine 110, a machine learning controller 130, a first client device 140, and/or a second client device 170 may be communicatively coupled, via a wired and/or wireless network 120. The wired and/or wireless network 120 can be a wide area network (WAN), a local area network (LAN), and/or the Internet.

In some example embodiments, the global machine learning engine 110 may implement one or more machine learning models including, for example, a neural network (e.g., convolutional neural network), a belief network, and/or a restricted Boltzmann machine. As such, the global machine learning engine 110 may be configured to perform a variety of cognitive tasks including, for example, object identification, natural language processing, information retrieval, and speech recognition.

Figure 1C:
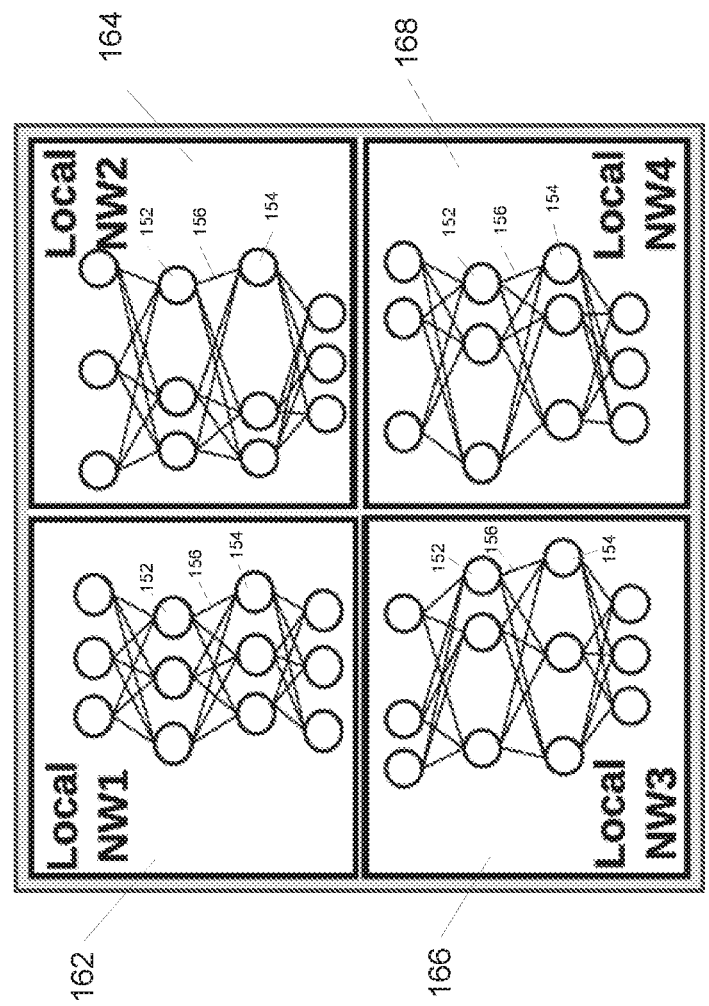
FIG. 1C depicts a topology diagram illustrating a plurality of local machine learning model, in accordance with some example embodiments.
Figure 1B:
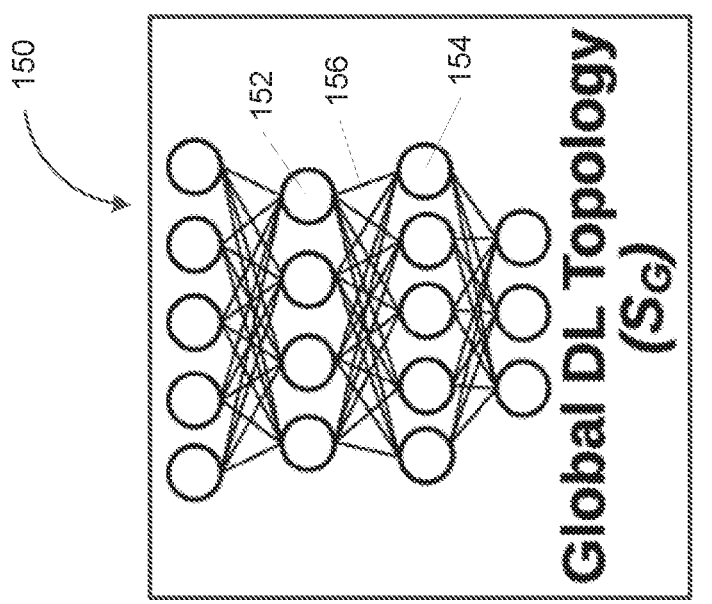
FIG. 1B depicts a topology diagram illustrating a global machine learning model, in accordance with some example embodiments.

FIG. 1B depicts a topology diagram illustrating a global machine learning model, in accordance with some example embodiments. Referring to FIGS. 1A-B, the global machine learning engine 110 may implement a neural network (e.g., a convolutional neural network) such as, for example, a global neural network 150. As shown in FIG. 1B, the global neural network 150 may include a plurality of neurons that are interconnected by a plurality of edges. Each of the plurality of neurons may be associated with one or more parameters (e.g., weight, bias, and/or the like) that may be adjusted (e.g., during training of the global neural network 150) to minimize an error (e.g., difference relative to a ground truth) in an output of the global neural network 150.

Referring again to FIG. 1B, the global neural network 150 may include a first neuron 152 that is connected to a second neuron 154 via an edge 156. The plurality of neurons may form the different layers of the global neural network 150 including, for example, an input layer, a convolutional layer, a pooling layer, and/or a fully connected layer. Neurons in a particular layer of the global neural network 150 may be configured to perform a certain function (e.g., convolution, pooling) on data passing through that layer of the global neural network 150. For instance, the first neuron 152 may be in a convolutional layer of the global neural network 150 and may thus be configured to act as a convolutional filter that detects the presence of a certain feature in data passing through the convolutional layer of the global neural network 150. Meanwhile, the second neuron 154 may be in a pooling layer of the global neural network 150 and may be configured to apply a pooling function (e.g., max pool function, average pool function) that subsamples the features detected by at least the first neuron 152.

In some example embodiments, the machine learning controller 130 may be configured to partition a global machine learning model (e.g., the convolutional neural network 50 implemented by the global machine learning engine 110) into a corresponding plurality of local machine learning models. For example, the first client device 140 may be a resource-constrained platform (e.g., a portable platform such as a drone, a robot, a smartphone, a tablet personal computer, and/or a wearable device). Thus, instead of implementing the global machine learning model on the first client device 140, the machine learning controller 130 may partition the global machine learning model based at least on the resource constraints (e.g., memory, processor, bandwidth, and/or the like) of the first client device 140. For instance, in some example embodiments, the machine learning controller 130 may determine these resource constraints such that the global machine learning model may be partitioned accordingly. In doing so, the machine learning controller 130 may generate a plurality of local machine learning models that match the resource constraints of the first client device 140 and may therefore be implemented on the first client device 140.

FIG. 1C depicts a topology diagram illustrating a plurality of local machine learning models, in accordance with some example embodiments. Referring to FIGS. 1A-C, the machine learning controller 130 may partition the global neural network 150 into a plurality of local convolutional neural network that conforms to the constraints (e.g., memory, processor, bandwidth, and/or the like) of the first client device 140 and may thus be executed (e.g., in parallel and/or in sequence) at the first client device 140. For instance, as shown in FIG. 1C, the global neural network 150 may be partitioned into a first local neural network 162, a second local neural network 164, a third local neural network 166, and a fourth local neural network 168.

The first local neural network 162, the second local neural network 164, the third local neural network 166, and the fourth local neural network 168 may each have a subset of the neurons (e.g., the first neuron 152, the second neuron 154) and corresponding interconnections (e.g., the edge 156) present in the global neural network 150. In some example embodiments, at least some of the first local neural network 162, the second local neural network 164, the third local neural network 166, and/or the fourth local neural network 168 may include overlapping subsets of neurons and/or interconnections. Thus, one or more of the same neurons (e.g., the first neuron 152 and/or the second neuron 154) and/or interconnections (e.g., the edge 156) may appear in more than one local neural network. Moreover, according to some example embodiments, the global neural network 150 may be partitioned depth first (e.g., instead of breadth first). Doing so may generate a corresponding plurality of local neural networks that have a same number of layers as the global neural network 150. As shown in FIG. 1C, the first local neural network 162, the second local neural network 164, the third local neural network 166, and the fourth local neural network 168 may each have the same four layers (e.g., input layer, convolutional layer, pooling layer, and/or fully connected layer) as the global neural network 150.

In some example embodiments, the first client device 140 may include a local machine learning engine 145. The local machine learning engine 145 may be configured to implement a plurality of local machine learning models (e.g., the first local neural network 162, the second local neural network 164, the third local neural network 166, and the fourth local neural network 168) that conform to the resource constraints of the first client device 140. For instance, the local machine learning engine 145 may train and/or execute the plurality of local machine learning models.

In some example embodiments, the training and/or execution of the plurality of local machine learning models may be performed based on the resource constraints (e.g., memory, processor, bandwidth, and/or the like) of the first client device 140. Thus, the local machine learning engine 145 may implement network parallelism in training and/or executing the global machine learning model, when sufficient resources are available at the first client device 140. That is, multiple local machine learning models may be trained and/or executed in parallel when sufficient resources are available at the first client device 140 to support the simultaneous training and/or execution of multiple local machine learning models. Alternately and/or additionally, at least some of the plurality of local machine learning models may be trained and/or executed in sequence when the available resources at the first client device 140 prevents more than a threshold number of the local machine learning models from being trained and/or executed at once. It should be appreciated that the resources available at the first client device 140 may fluctuate (e.g., over time). As such, the quantity of local machine learning models that may be executed in parallel and/or in sequence at the first client device 140 may also vary dynamically in accordance with the variations in the available resources.

In some example embodiments, the machine learning controller 130 may be configured to preprocess data that is to be processed by a plurality of local machine learning models (e.g., the first local neural network 162, the second local neural network 164, the third local neural network 166, and the fourth local neural network 168) at the first client device 140 (e.g., by the local machine learning engine 145). For instance, the plurality of local machine learning models may be required to process high-dimensional data (e.g., raw data collected by one or more sensors at the first client device 140). As such, the machine learning controller 130 may preprocess the high-dimensional data by at least reducing the dimensionality of the high-dimensional data. For example, the machine learning controller 130 may transform the high dimensional data into a plurality of lower dimensional embeddings. That is, the machine learning controller 130 may factorize the high-dimensional data (e.g., a data matrix $A_{m \times n}$) into a corresponding dictionary (e.g., a dictionary matrix $D_{m \times l}$) and a encoding (e.g., an coefficient matrix $C_{l \times n}$). However, it should be appreciated that other dimensionality reduction techniques may also be used including, for example, principal component analysis (PCA), random projection, feature hashing, and/or the like.

In some example embodiments, the machine learning controller 130 may be configured to implement data parallelism in training and/or executing a global machine learning model (e.g., implemented by the global machine learning model 110). For example, the machine learning controller 130 may preprocess data into a plurality of encodings. At least some of these encodings may be processed in parallel (e.g., by two or more of the local machine learning models implemented by the local machine learning engine 145), when sufficient resources are available at the first client device 140. Alternately and/or additionally, at least some of the plurality of encodings may be processed in sequence by the local machine learning models (e.g., implemented by the local machine learning engine 145). It should be appreciated that the machine learning controller 130 may vary, based at least on fluctuations in the resources available at the first client device 140, the quantity or portion of encodings being processed in parallel and/or in sequence.

In some example embodiments, the machine learning controller 130 may be further configured to implement hardware parallelism when training and/or executing a global machine learning model. For instance, the machine learning controller 130 may be configured to train and/or execute a plurality of local machine learning models across multiple hardware platforms including, for example, the first client device 140 and the second client device 170. Alternately and/or additionally, the first client device 140 and/or the second client device 170 may include multi-core processors that may be capable of simultaneously training and/or executing multiple local machine learning models. It should be appreciated that the machine learning controller 130 may be configured to simultaneously implement network parallelism, data parallelism, and hardware parallelism when training and/or executing the global machine learning model.

In some example embodiments, the machine learning controller 130 may be configured to coordinate the operations of a global machine learning model (e.g., the global neural network 150 implemented by the global machine learning engine 110) and a corresponding plurality of local machine learning models (e.g., the first local neural network 162, the second local neural network 164, the third local neural network 166, and/or the fourth local neural network 168 implemented by the local machine learning engine 145). For example, the first local neural network 162, the second local neural network 164, the third local neural network 166, and/or the fourth local neural network 168 may be trained independently. Training a local neural network may include processing or forward propagating, through the local neural network, training data that includes ground-truth labeled data. Errors (e.g., deviation from the ground truth associated with the training data) present in the output of the local neural network may be backpropagated through the local neural network. Moreover, parameters (e.g., weights, biases, and/or the like) applied by the local neural network (e.g., in processing the training data) may be adjusted (e.g., through gradient descent) in order to minimize the error present in the output of the local neural network. The machine learning controller 130 may propagate these changes by at least making corresponding changes to the same parameters at the global neural network 150.

Figure 3A:
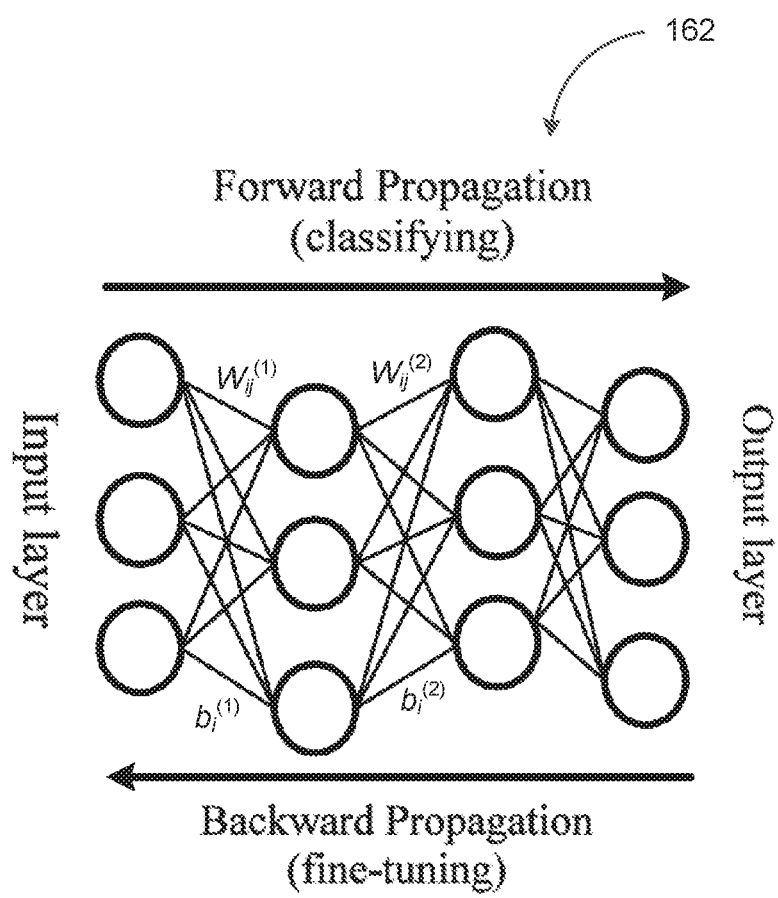
FIG. 3A depicts a topology diagram illustrating a forward propagation and a backward propagation through a local neural network system, in accordance with some example embodiments.

To further illustrate, FIG. 3A depicts a topology diagram illustrating a forward propagation and a backward propagation through the first local neural network 162, in accordance with some example embodiments. Referring to FIG. 3A, the first local neural network 162 may be trained by at least processing (e.g., forward propagating) training data with the local neural network 162. In the example shown in FIG. 3A, the first local neural network 162 may process the training data to at least generate classifications for the training data. Errors present in the output (e.g., classifications) of the first local neural network 162 may be backpropagated through the first local neural network 162, thereby forming a corresponding error function for the first local neural network 162. Each of the neurons (e.g., the first neuron 152, the second neuron 154) present in the first local neural network 162 may apply one or more parameters when processing the training data. For instance, as shown in FIG. 3A, the first local neural network 162 may apply a plurality of weights (e.g., $W_{ij}^{(1)}$, $W_{ij}^{(2)}$) and/or biases (e.g., $b_i^{(1)}$, $b_i^{(2)}$). Thus, training the first local neural network 162 may further include adjusting these parameters (e.g., the weights $W_{ij}^{(1)}$ and/or $W_{ij}^{(2)}$, the biases $b_i^{(1)}$ and/or $b_i^{(2)}$) to minimize the errors present in the output of the first local neural network 162. It should be appreciated that training the first local neural network 162 may include processing the same training data repeatedly until convergence, which may occur when the error function associated with the first local neural network 162 is at a minima (e.g., stops decreasing). Adjustments made to the parameters (e.g., the weights $W_{ij}^{(1)}$ and/or $W_{ij}^{(2)}$ the biases $b_i^{(1)}$ and/or $b_i^{(2)}$) in the first local neural network 162 may be propagated to the global neural network 150. For instance, the machine learning controller 130 may update the same parameters (e.g., weights, biases, and/or the like) at the global neural network 150 to match the parameters at the first global neural network 162.

In some example embodiments, training one local machine learning model (e.g., the first local neural network 162) may update at least some of the parameters of the global neural network 150 but the other local machine learning models (e.g., the second local neural network 164, the third local neural network 166, and/or the fourth local neural network 168) may still be applying stale parameters without the same updates. It should be appreciated that the operations to update the parameters (e.g., weight, bias, and/or the like) at the global neural network 150 may be both communicative and associative. As such, the cumulative effect of applying stale parameters at a local machine learning model may be negligible over time. The parameters (e.g., associated with the first neuron 152 and/or the second neuron 154) at the global neural network 150 may converge to a correct value after several iterations of updating the parameters of the global neural network 150.

In some example embodiments, the machine learning controller 130 may be configured to optimize the computation costs and communication costs of training and/or executing a global machine learning model. For example, computational resources may be expended in training and/or executing one or more of the plurality of local machine learning models (e.g., the first local neural network 162, the second local neural network 164, the third local neural network 166, and/or the fourth local neural network 168) at the first client device 140. Meanwhile, communication resources may be expended in propagating, to the global machine learning model (e.g., the global neural network 150), updates to parameters determined at the plurality of local machine learning models (e.g., the first local neural network 162, the second local neural network 164, the third local neural network 166, and/or the fourth local neural network 168). Communication costs may be optimized by at least adjusting a frequency with which the machine learning controller 130 updates the global machine learning model based on changes to parameters at one or more of the local machine learning models.

In some example embodiments, as shown in FIG. 1A, the machine learning controller 130 may be deployed at a cloud platform such that one or more functionalities of the machine learning controller 130 may be accessed remotely (e.g., by the first client device 140). However, it should be appreciated that the machine learning controller 130 may also be deployed locally (e.g., at the first client device 140) as software and/or circuitry (e.g., application specific integrated circuit (ASIC), field programmable gate array (FPGA)).

Figure 2:
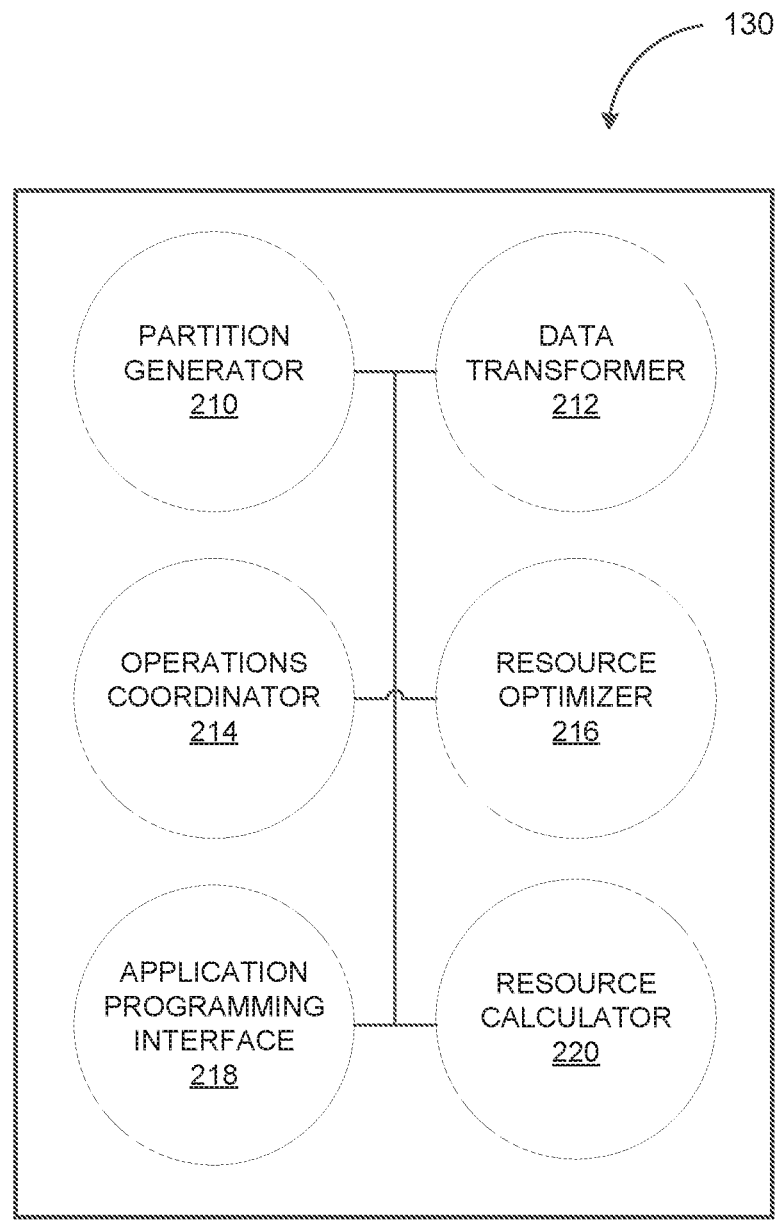
FIG. 2 depicts a block diagram illustrating a machine learning controller, in accordance with some example embodiments.

FIG. 2 depicts a block diagram illustrating the machine learning controller 130, in accordance with some example embodiments. Referring to FIGS. 1-2, the machine learning controller 130 may include a plurality of modules including, for example, a partition generator 210, a data transformer 212, an operations coordinator 214, a resource optimizer 216, an application programming interface 218, and a resource calculator 220. It should be appreciated that the machine learning controller 130 may include different and/or additional modules than shown.

In some example embodiments, the partition generator 210 may be configured to partition a global machine learning model (e.g., the global neural network 150) into a plurality of local machine learning models (e.g., the first local neural network 162, the second local neural network 164, the third local neural network 166, and/or the fourth local neural network 168). For instance, the resource overhead associated with the global neural network 150 may exceed the capacity (e.g., memory, processor, and/or bandwidth) of the first client device 140, thereby preventing the global neural network 150 from being implemented at the first client device 140 in its entirety. To illustrate, Table 1 below depicts the resource overhead associated with various layer of a deep learning model such as a neural network (e.g., the global neural network 150).

TABLE 1

| DL Layer | Description | Computation |
|---|---|---|
| Convolution | Multiplying the filter weights ($W_{ij}$) with the post-nonlinearity values in the preceding layer ($y_{ij}^{l-1}$) and summing the results | $x_{ij}^{(l)} = \sum_{a=1}^{m} \sum_{b=1}^{m} W_{ab}^{(l-1)} \times y_{(i+a)(j+b)}^{l-1}$ |
| Max Pooling | Computing the maximum value of k × k overlapping regions in the N × N grid of the underneath layer | $x_{ij}^{(l)} \text{Max}(y_{(i+a)(j+b)}^{j-1}) \alpha \in \{1, 2, \ldots, k\}, b \in \{1, 2, \ldots, k\}$ |
| Mean Pooling | Computing the mean value of k × k non-overlapping regions in the N × N grid of the underneath layer | $x_{ij}^{(l)} \text{Mean}(y_{(i+a)(j+b)}^{j-1}) \alpha \in \{1, 2, \ldots, k\}, b \in \{1, 2, \ldots, k\}$ |
| Fully-Connected | Multiplying the weights of the $l^{th}$ layer ($W_{ij}^{l}$) with the post-nonlinearity values in the preceding layer ($y_{ij}^{l-1}$) | $x_i^l = \sum_{j=1}^{n_{l-1}} W_{ij}^{l-1} \times y_j^{(l-1)}$ |
| Non-linearity | Sigmoid | $S_j(x_j) = \dfrac{1}{1 + e^{-x_j}}$ |
|  | Softmax | $\sigma_j(x_j) = \dfrac{e^{x_j}}{\sum_{k=0}^{n_c} e^{x_k}}$ |
|  | Tangent Hyberbolic (Tanh) | $\dfrac{\text{Sinh}(x)}{\text{Cosh}(x)}$ |
|  | Rectified Linear Unit (ReLu) | Max(0, x) |

In some example embodiments, the partition generator 210 may partition the global neural network 150 based at least on the resource constraints (e.g., memory, processor, and/or bandwidth) of the first client device 140, thereby generating a plurality of local neural networks including, for example, the first local neural network 162, the second local neural network 164, the third local neural network 166, and the fourth local neural network 168. For instance, the partition generator 210 may determine the resources required to train and/or execute the global neural network 150 including by, for example, determining the resources required to perform the functions at each layer of the global neural network 150 (e.g., in accordance with Table 1).

As noted above, the resources required to train and/or execute the global neural network 150 may exceed the resource available at the first client device 140. Thus, the partition generator 210 may partition the global neural network 150 into a plurality of local neural networks that may each include only a subset of the neurons and corresponding interconnections of the global neural network 150. The available resources at the first client device 140 may support the training and/or execution of one or more of the plurality of local neural networks (e.g., the first local neural network 162, the second local neural network 164, the third local neural network 166, and/or the fourth local neural network 168). For instance, the first client device 140 may have sufficient resources to train and/or execute at least some of the plurality of local neural networks in sequence. Alternately and/or additionally, the first client device 140 may have sufficient resources to train and/or execute at least some of the plurality of local neural networks in parallel.

In some example embodiments, the data transformer 212 may be configured to preprocess data that is to be processed by a local machine learning model (e.g., the first local neural network 162, the second local neural network 164, the third local neural network 166, and/or the fourth local neural network 168 implemented by the local machine learning engine 145) at the first client device 140. For instance, the data may be raw data (e.g., collected by one or more sensors at the first client device 140) having a high dimensionality. Thus, the preprocessing of the data may to conform to the resource constraints of the first client device 140. For instance, preprocessing the data may include transforming the data to at least reduce the dimensionality of the data. Transforming the data in this manner may render the data more suitable for processing by the plurality of local machine learning models.

In some example embodiments, the preprocessing of the data may include factoring high-dimensional data (e.g., a data matrix $A_{m \times n}$) into a product of a dictionary (e.g., a dictionary matrix $D_{m \times l}$) and a encoding (e.g., an coefficient matrix $C_{l \times n}$) that exhibits a target sparsity. The objective of the preprocessing of the data may be defined by Equation (1) below:

$$\underset{D \in R^{m \times l},\, C \in R^{l \times n}}{\text{minimize}} \|A - DC\|_F \text{ subject to } \|C\|_0 \le kn, \quad (1)$$

Wherein the input data A may be an m×n matrix that is the input into a local neural network (e.g., implemented at the first client device 140), the dictionary D may be an m×l dictionary matrix, and the encoding C may be an m×l coefficient matrix. In Equation (1), $\|C\|_0$ may measure a total number of non-zero elements in the encoding C. The variable l may be a size of the dictionary, the variable m may be a size of a feature space of each transformed sample of the input data, and the variable k may be a target sparsity level of each transformed sample (k<l) of the input data. According to some example embodiments, it may be shown that the objective l<<m<<n may be achieved for any arbitrarily large real-world datasets. As the size of the size l of the dictionary D may be less than a size m of the feature space of the input data A, the dictionary D may be used to adaptive transform the input data A into a plurality of lower dimension encodings C.

In some example embodiments, the dictionary D may be generated iteratively based on various samples of the input data A and a corresponding projection error. For instance, for a sample $a_i$ of the input data A, the data transformer 212 may determine a corresponding projection error $W_p(a_i)$. The lower dimensional encoding C may be updated when this projection error $W_p(a_i)$ is determined to be less than a threshold value α. It should be appreciated that reduced dimension representation of the input data A having the target sparsity level k and a minimal amount of inference error may be achieved based on only a small subset (e.g., a few samples $a_i$) of the input data A.

Table 2 below depicts pseudo program code implementing an orthogonal matching pursuit (OMP) technique for adaptively generating the dictionary D. In some example embodiments, the dictionary D and the encoding C may be initialized as empty sets. The data transformer 212 may iteratively update the encoding C based on each new sample $a_i$ of the input data A. Meanwhile, the data transformer 212 may also determine a corresponding projection error $W_p(a_i)$ for the new sample $a_i$, which may indicate whether the current dictionary D is sufficient for representing the new sample $a_i$. The data transformer 212 may update the current encoding C when the projection error $W_p(a_i)$ exceeds the threshold value α, thereby indicating that the current dictionary D is not sufficient to represent the new sample $a_i$.

TABLE 2

Algorithm 1 OMP Algorithm

Inputs: Dictionary matrix D, Sample column a, Sparsity level k.

Output: Coefficient vector c.

1:    $r^0 \leftarrow a$
2:    $\wedge^0 \leftarrow \emptyset$
3:    for $i = 1,\ldots,k$ do
4:        $\wedge^i \leftarrow \wedge^{i-1} \cup \text{argmax}_j |\langle r_{i-1}, D_j \rangle|$, where j ranges over all the column index values of the dictionary D
5:        $c_{\wedge^i} \leftarrow \text{argmin}_c \| r^{i-1} - D_{\wedge^i} c \|_2^2$, where c is a vector variable in $R^i$
6:        $r^i \leftarrow r^{i-1} - D_{\wedge^i} c_{\wedge^i}$
        end for According to some example embodiments, the encoding C may be used as input data into one or more local machine learning models (e.g., the first local neural network 162, the second local neural network 164, the third local neural network 166, and/or the fourth local neural network 168) at the first client device 140. As noted above, the encoding C may conform to the resource constraints (e.g., memory, processor, bandwidth, and/or the like) of the first client device 140. Specifically, the data transformer 212 may adaptively adjust the size l of the dictionary D and/or the target sparsity level k such that the resulting encoding C conforms to the resource constraints (e.g., memory, processor, bandwidth, and/or the like) of the first client device 140.

Moreover, in some example embodiments, the encoding C may serve as an encrypted version of the input data A. It should be appreciated that without the corresponding dictionary D, the input data A cannot be computed based on the encoding C alone. As such, the first client device 140 may outsource and/or share the encoding C with one or more other devices without divulging the actual input data A.

In some example embodiments, the operations coordinator 214 may be configured to coordinate the training and/or execution of a global machine learning model (e.g., the global neural network 150) including by coordinating the training and/or execution of one or more local machine learning models (e.g., the first local neural network 162, the second local neural network 164, the third local neural network 166, and/or the fourth local neural network 168) implemented at a resource-constrained platform such as, for example, the first client device 140 (e.g., the local machine learning engine 145). It should be appreciated that when sufficient resources are available (e.g., at the first client device 140), the operations coordinator 214 may be train and/or execute multiple local machine learning models in parallel. However, the operations coordinator 214 may vary the quantity of local machine learning models that are trained and/or executed in parallel and/or in sequence based on fluctuations in available resources. Moreover, it should be appreciated that each local machine learning model may be trained and/or executed independently. That is, one local machine learning model may be trained and/or executed without requiring any updates (e.g., of parameters) from the training and/or execution of another local machine learning model.

In some example embodiments, the operations coordinator 214 may train a global machine learning model by at least training (e.g., in sequence and/or in parallel) one or more local machine learning models. These local machine learning models may be trained on based on training data that have been transformed (e.g., by the data transfer 212) to lower dimension encodings (e.g., the encoding C) that conform to the resource constraints of the first client device 140. Table 3 below depicts pseudo program code implementing the training of a global machine learning model (e.g., the global neural network 150). As noted above, a global machine learning model (e.g., the global neural network 150) may be trained by at least training (e.g., in parallel and/or in sequence) a corresponding plurality of local machine learning models (e.g., the first local neural network 162, the second local neural network 164, the third local neural network 166, and/or the fourth local neural network 168).

TABLE 3

Algorithm 2 : MobiDeep (Training Phase)

Inputs: Measurement matrix (A), Transformation parameters ($\alpha$, k, l), Sample size ($n_{epoch}$), Training labels ($L_T$), and Model parameters (layer$_{size}$)
Output: Dictionary matrix D, coefficient matrix C, and Classifier parameters param.

1:   D ← empty
2:   param ← empty
3:   j ← 0
4:   i ← 0
5:   while (true) do
6:     $C_i$ ← 0
7:     if D is empty then
8:       $W_p(a_i) = 1$
9:     else
10:    
$$W_p(a_i) = \frac{\|D(D^tD)^{-1}D^ta_i - a_i\|2}{\|a_i\|2}$$

end if
11:    if $W_p(a_i) > \alpha$ and j < l then
12:      D ← [D, $a_i / \sqrt{\|a_i\|2}$]
13:      $C_{ij} = \sqrt{\|a_i\|2}$
14:      j ← j + 1
15:    else
16:      $C_i$ ← O M P(D, $a_i$, k)
       end if
17:    C ← [C, $C_i$]
18:    i ← i + 1
19:    if i mod $n_{epoch}$ == 0 then
20:      param ← D N N (C, param, layer$_{size}$, $L_T$)
       end if
     end while In some example embodiments, the operations coordinator 214 may execute a global machine learning model by at least executing (e.g., in sequence and/or in parallel) one or more local machine learning models. These local machine learning models may be executed on based on production data that have been transformed (e.g., by the data transfer 212) to lower dimension encodings (e.g., the encoding C) that conform to the resource constraints of the first client device 140. Table 4 below depicts pseudo program code implementing the execution of a global neural network (e.g., the global neural network 150). As noted above, a global machine learning model (e.g., the global neural network 150) may be executed by at least executing (e.g., in parallel and/or in sequence) a corresponding plurality of local machine learning models (e.g., the first local neural network 162, the second local neural network 164, the third local neural network 166, and/or the fourth local neural network 168).

TABLE 4

Algorithm 3: MobiDeep (Execution Phase)

Inputs: Measurement matrix ($A^{test}$), Dictionary matrix D, Sparsity level k, and Model parameters (param)
Output: Class Label Y
1:   i ← 0
2:   while (true) do
3:     Ci ← O M P (D, $A_i^{test}$, k)

TABLE 4-continued

Algorithm 3: MobiDeep (Execution Phase)

```
4:        Y_i ← D N N_{forward}(C_i^t, param)
5:        i ← i + 1
      end while
```

In some example embodiments, the operations coordinator 214 may be configured to synchronize parameters applied at a global machine learning model (e.g., implemented at the global machine learning engine 110) and one or more of the plurality of local machine learning models (e.g., the first local neural network 162, the second local neural network 164, the third local neural network 166, and/or the fourth local neural network 168) being trained and/or executed at the first client device 140 (e.g., by the local machine learning engine 145).

In some example embodiments, the operations coordinator 214 may initiate, for each local machine learning model, a pair of send thread and receive thread. Each pair of send thread and receive thread may be associated with a portion (e.g., subset of neurons and interconnections) of the global machine learning model (e.g., the global neural network 150), which may be partitioned to be a part of a local machine learning model.

Figure 3B:
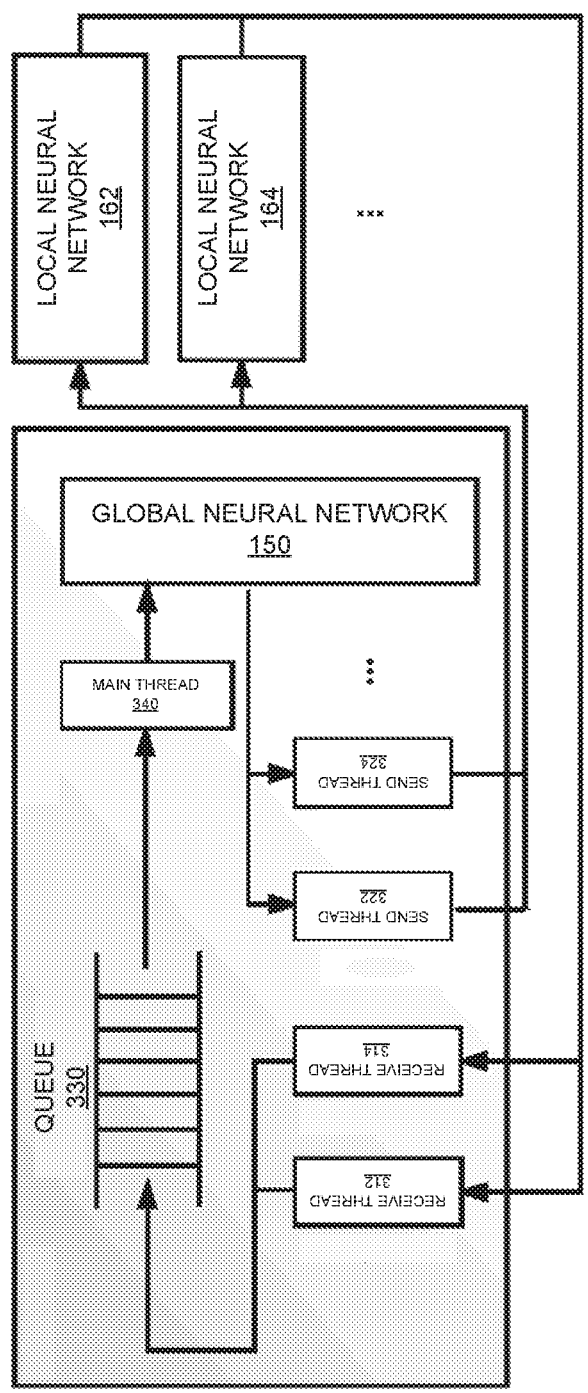
FIG. 3B depicts a block diagram illustrating a plurality of pairs of send threads and receive threads, in accordance with some example embodiments.

To further illustrate, FIG. 3B depicts a block diagram illustrating a plurality of pairs of send threads and receive threads, in accordance with some example embodiments. As shown in FIG. 3B, the first local neural network 162 may be associated with a first receive thread 312 and a first send thread 322 while the second local neural network 164 may be associated with a second receive thread 314 and a second send thread 324. It should be appreciated that other local neural networks (e.g., the third local neural network 166 and/or the fourth local neural network 168) may be similarly associated with a pair of receive thread and send thread.

In some example embodiments, a send thread may be configured to send parameters from a global machine learning model to one or more corresponding local machine learning models. As noted earlier, each local machine learning model may include a portion of the global machine learning model. Thus, a send thread may be configured to send, to a corresponding local machine learning model, parameters from the global machine learning model that are associated with the portion of the global machine learning model included in the local machine learning model. For instance, the first send thread 322 may be configured to send, to the first local neural network 162, parameters (e.g., weights and/or biases) from the global neural network 150 that are associated with neurons (e.g., the first neuron 152 and/or the second neuron 154) present in the first local neural network 162. Similarly, the second send thread 324 may be configured to send, to the second local neural network 164, parameters (e.g., weights and/or biases) from the global neural network 150 that are associated with neurons present in the second local neural network 164.

In some example embodiments, a receive thread may be configured to receive one or more parameters from a local machine learning model, which may be used to update the corresponding parameters at the global machine learning model. For instance, the first receive thread 312 may be configured to receive, from the first local neural network 162, parameters (e.g., weights and/or biases) for neurons (e.g., the first neuron 152 and/or the second neuron 154) that are also present in the global neural network 150. Similarly, the second receive thread 314 may be configured to receive, from the second local neural network 164, parameters (e.g., weights and/or biases) for neurons that are also present in the global neural network 150. According to some example embodiments, the first receive thread 312 and/or the second receive thread 314 may add the parameters to a queue 330. Meanwhile, a main thread 340 may be configured to update the global neural network 150 based on the parameters in the queue 330.

In some example embodiments, the operations coordinator 214 may train a global machine learning model by least implementing the plurality of pairs of send threads and receive threads. Referring again to FIG. 3B, the operations coordinator 214 may train the global neural network 150 by at least running the first receive thread 312, the second receive thread 314, the first send thread 322, the second send thread 324, and/or the main thread 340. According to some example embodiments, the main thread 340 may be configured to interrupt the operations of the first receive thread 312, the second receive thread 314, the first send thread 322, and/or the second send thread 324, when the operations coordinator 214 determines that the global neural network 150 has achieved convergence (e.g., error function reached a minima) and/or when the operations coordinator 214 determines that the global neural network 150 has been subject to a threshold number of training iterations (e.g., epochs).

Table 5 below depicts pseudo program code implementing the synchronization of parameters between a global machine learning model and a plurality of corresponding local machine learning models. It should be appreciated that the operations coordinator 214 may train multiple local machine learning models independently but in parallel when sufficient resources are available (e.g., at the first client device 140) to support the simultaneous training of more than one local machine learning model.

TABLE 5

Algorithm 1 Deep$^3$ Neural Network Parallelism

Input: Global DL Model ($S_c$), Error Threshold δ, Local DL Model ($S_L$), Training Data Embedding & Labels ($C_{Tr}$), Number of Processors $N_p$, and Maximum Number of Iterations Max-itr
Output: Trained Global DL Parameters $DL_{glob}$
0.    Send-Thread (thread ID, $S_c$, $S_L$, history):
          Send_count = 0
          While(! done_flag):
              Index$_L$ ← NetworkSubsampling($S_L$)

TABLE 5-continued

Algorithm 1 Deep³ Neural Network Parallelism

```
            DL_local^init ← S_c.get_weights(Index_L)
            comm.send (DL_local^init, dest = threadID)
            history[threadID].append (Index_L)
            send − count ← send − count + 1
1.       Receive-Thread (thread ID, Q, Q-Lock) :
            Rcounter = 0
            While(! doneflag):
               ΔW_L = comm.recv(source = threadID)
               lock(QLock)
               Q.put([ΔW_L, threadID,Rcounter])
               release (Q − Lock)
               Rcounter ← Rcounter + 1
2.    Main :
         If (P_iδ == 0) : // Parameter Coordinator
            Q = Queue ( )
            queue_Lock = threading.Lock ( )
            DL_glob ← RandomInitialization( )
            itr = 0
            history = [ ]
            doneflag ← False
            Creation & Initialization of Send-Threads & Receive-Threads
            // Main Thread in Parameter Coordinator
                  While(δ̃ ≥ δ or itr ≤ Max − itr) :
                     [ΔW_L,thread,Rcounter] ← Q.get( )
                     Index_L ← history[threadID][Rcounter]
                     DL_glob ← S_c.get_weights(S_c)
                     S_c.set − weights(DL_glob + ΔW_L,Index_L)
                     δ̃ ← UpdateValidationError(S_c)
                     itr ← itr + 1
                  done_flag ← True
                  DL_glob ← S_c.set_weights(S_c)
                  Broadcasts done_flag & Exit
         else: //Local Network Kernels
            While (! doneflag) :
               DL_local^init = comm.recv(source = 0)
               S_L.set_weights( DL_local^init)
               DL_local ← DL_local^init
               i ← 0
               while (i ≤ n_push) :
                  C_Tr^i ← GetNextDataBatch( )
                  DL_local ← UpdateDL(DL_local, C_Tr^i)
                  i ← i + 1
               ΔW_L ← DL_local − DL_local^init
               comm.send(ΔW_L, dest = 0)
```

In some example embodiments, the resource optimizer 216 may be configured to optimize the computation costs and communication costs associated with the training and/or execution of a global machine learning model. For instance, Equation (2) below defines the time $T_{itr}$ required to perform a single training iteration (e.g., epoch).

$$T_{itr} = n_{push} \sum_{i=1}^{N_p} \left( T_i^{FP} + T_i^{BP} \right) + \frac{2}{n_{push}} \sum_{i=1}^{N_p} T_i^{comm}, \quad (2)$$

wherein the first term $n_{push}$ $$\sum_{i=1}^{N_p} \left( T_i^{FP} + T_i^{BP} \right)$$

may represent the computation cost of simultaneously training an $N_p$ number of local machine learning models while the second term $$\frac{2}{n_{push}} \sum_{i=1}^{N_p} T_i^{comm}$$

may represent the communication cost of propagating updates from the local machine learning models to the global machine learning model. The variables $T_i^{FP}$ and $T_i^{BP}$ may denote the respective computation cost associated with performing a forward propagation and a backward propagation (e.g., of training data) through the local machine learning models. Meanwhile, variable $n_{push}$ may denote a frequency with which updates from a local machine learning model is propagated (e.g., by the operations coordinator 214) to a global machine learning model.

Table 6 below depicts the computation costs and communication costs associated with training a global machine learning model that is configured as a fully-connected deep neural network. As shown in Table 6, the communication cost of synchronizing parameters between a global machine learning and a plurality of local machine learning models tend to dominate the overall cost associated with training the global machine learning model. It should be appreciated that training a convolutional neural network may incur the same and/or similar computation costs and communication costs as those set forth in Table 6.

TABLE 6

Computation and Communication Costs $$T_i^{FP} = \alpha_{flop} \sum_{s=1}^{S-1} n_i^{(s)} n_i^{(s+1)} + a_{act} \sum_{s=1}^{S} n_i^{(s)}$$

S: total number of DNN layers
$\alpha_{flop}$: multipl_add + memory communication cost
$\alpha_{act}$: activation function cost $$T_i^{BP} = 2\alpha_{flop} \sum_{s=1}^{S-1} n_i^{(s)} n_i^{(s+1)} + \alpha_{err} \sum_{s=1}^{S} n_i^{(s)}$$

$\alpha_{err}$: propagation error cost $$T_i^{Comm} = \alpha_{net} + \frac{N_{bits} \sum_{s=1}^{S-1} n_i^{(s)} n_i^{(s+1)}}{BW_i}$$

$\alpha_{net}$: constant network latency
$N_{bits}$: number of signal representation bits
$BW_i$: operational communication bandwidth In some example embodiments, the resource optimizer 216 may optimize the computation cost and communication cost associated with training a global machine learning model (e.g., the global neural network 150) by at least adjusting the value of the variable $n_{push}$. For instance, increasing the value of $n_{push}$ may decrease the frequency of updates and reduce the communication cost associated with training the global machine learning model. However, decreasing the value of $n_{push}$ may also increase the computation cost due to a dearth of updates to optimize the global machine learning model. By contrast, decreasing the value of $n_{push}$ may cause a significant increase in communication cost. As such, according to some example embodiments, the resource optimizer 216 may be configured to tune the variable $n_{push}$ in order to conform to the resource constraints of the first client device 140 while balancing the tradeoff between computation cost and communication cost.

In some example embodiments, the application programming interface 218 may be configured to enable the machine learning controller 130 to be deployed on any pertinent system on chip (SoC) platform including, for example, a central processing unit (CPU), a graphics processing unit (GPU), and/or field programmable gate arrays (FPGAs) for rapid prototyping of a machine learning model (e.g., the global neural network 150).

In some example embodiments, the resource calculator 220 may be configured to determine the resource constraints of, for example, the first client device 140. For instance, the resource calculator 220 may determine the memory constraint, processing constraint, and/or bandwidth constraint imposed by the first client device 140. These constraints may prevent a global machine learning model (e.g., implemented by the global machine learning engine 110) from being trained and/or executed at the first client device 140. Thus, as noted above, the partition generator 210 may partition the global machine learning model to conform to the resource constraints of the client device 140, as determined by the resource calculator 220. Meanwhile, the data transformer 212 may preprocess data into a plurality of encodings that conform to the resource constraints of the client device 140, as determined by the resource calculator 220. It should be appreciated that the resource calculator 220 may be configured to determine the resource constraints of any type of devices (e.g., the first client device 140, the second client device 170) including, for example, devices having multi-core central processing units (CPUs), central processing unit (CPU) graphic processing units (GPU), and/or central processing unit (CPU) field programmable gate arrays (FPGAs).

It should be appreciated that the machine learning controller 130 may be configured to implement network parallelism, data parallelism, and/or hardware parallelism in training and/or executing a global machine learning model (e.g., implemented by the global machine learning engine 110). Parallelism across multiple facets may enhance machine learning performance by at least minimizing the resources (e.g., memory, processing, bandwidth, and/or the like) required for training and/or executing a machine learning model. For instance, the operations of the machine learning controller 130 (e.g., in partitioning a global machine learning model into a plurality of local machine learning models and/or in preprocessing data into lower dimensional encodings) may enable a 10 to 100 fold performance improvement in comparison to conventional implementations of machine learning models. Table 7 below depicts the performance improvement achieved by the machine learning controller 130.

TABLE 7

| Application | Memory Improvement | Energy Improvement | Training Latency Improvement | Execution Latency Improvement | DL Network Size Reduction |
|---|---|---|---|---|---|
| Smart Sensing | 14.8× | 48.4× | 10.1× | 43.5× | 43.7× |
| Indoor Localization | 3.6× | 5.6× | 2.7× | 19.4× | 19.5× |
| Speech Recognition | 3.1× | 5.5× | 2.2× | 2.6× | 2.8× |

Meanwhile, the machine learning controller 130 may be able to achieve significant performance improvement with relatively low preprocessing overhead. Table 8 below depicts the preprocessing overhead associated with the operations of the machine learning controller 130.

TABLE 8

| Application | Visual[14] (200 × 54129) | | | SmartSensing[15] (5625 × 9120) | | | Audio[16] (617 × 7797) | | |
|---|---|---|---|---|---|---|---|---|---|
| Platform ID | 1 | 2 | 3 | 1 | 2 | 3 | 1 | 2 | 3 |
| Turning Overhead | 49.7 s | 32.4 s | 63.5 s | 91.4 s | 53.8 s | 102.6 s | 31.1 s | 18.3 s | 37.5 s |
| Data Projection Overhead | 17.1 s | 9.8 s | 9.7 s | 18.9 s | 10.1 s | 10.1 s | 8.3 s | 4.9 s | 4.7 s |
| Overal | 66.8 s | 42.2 s | 73.2 s | 110.3 s | 63.9 s | 112.7 s | 39.4 s | 23.2 s | 42.2 s |

Figure 4A:
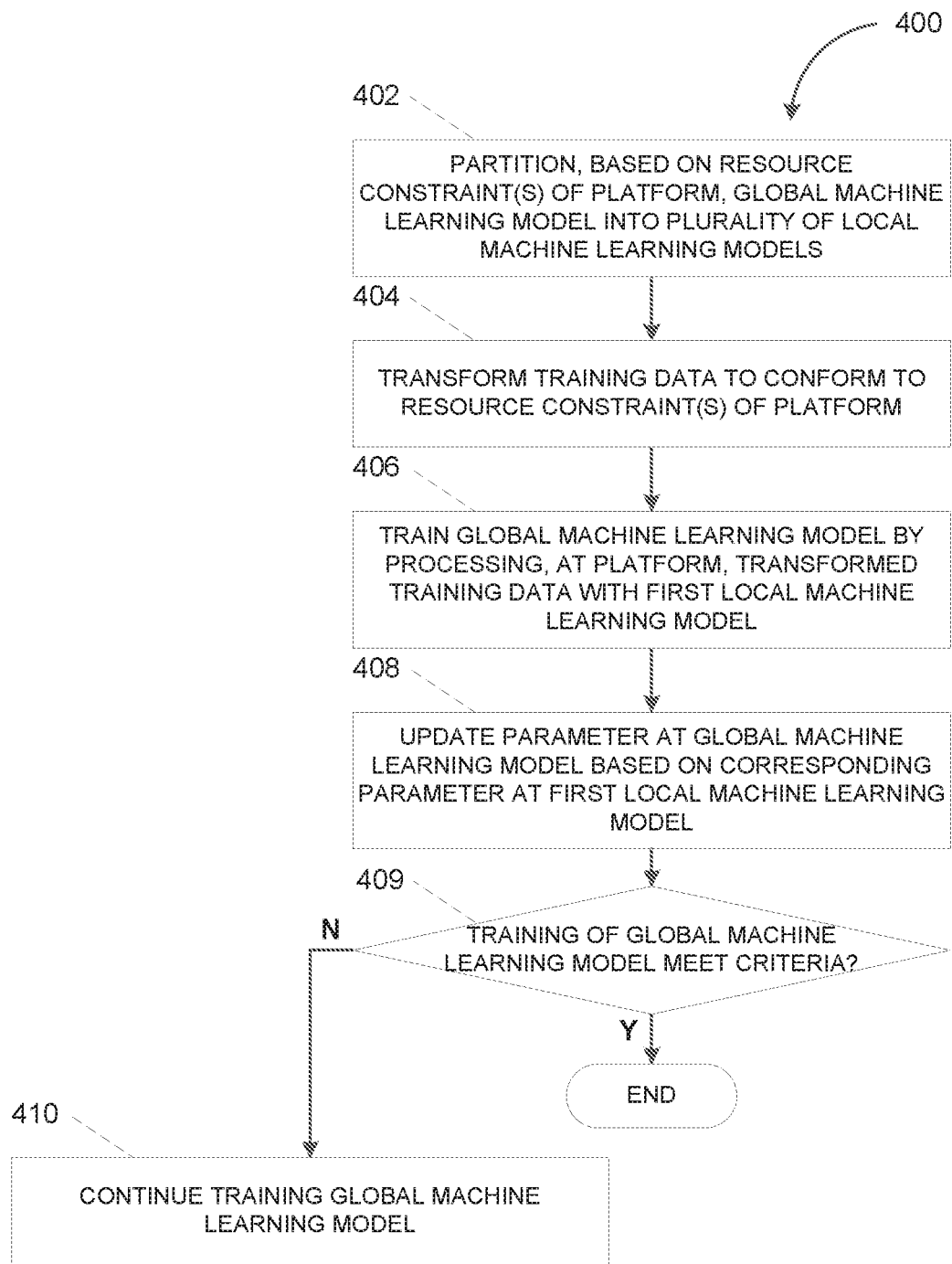
FIG. 4A depicts a flowchart illustrating a process for training a global machine learning model, in accordance with some example embodiments.

FIG. 4A depicts a flowchart illustrating a process 400 for training a global machine learning model, in accordance with some example embodiments. Referring to FIGS. 1A-C, 2, 3A-B, and 4A, the process 400 may be performed by the machine learning controller 130.

The machine learning controller 130 may partition, based at least on a resource constraint of a platform, a global machine learning model into a plurality of local machine learning models (402). For example, the resources (e.g., memory, processor, bandwidth, and/or the like) available at the first client device 140 may not be sufficient to support the training of the global neural network 150. Thus, in some example embodiments, the machine learning controller 130 (e.g., the partition generator 210) may partition the global neural network 150 into the first local neural network 162, the second local neural network 164, the third local neural network 166, and/or the fourth local neural network 168. The machine learning controller 130 may partition the global neural network 150 in accordance with the resource constraints (e.g., memory, processor, bandwidth, and/or the like) of the first client device 140, with each of the first local neural network 162, the second local neural network 164, the third local neural network 166, and/or the fourth local neural network 168 having a portion (e.g., overlapping subset) of the neurons and interconnections present in the global neural network 150. In doing so, the first client device 140 may have sufficient resources to train one or more of the first local neural network 162, the second local neural network 164, the third local neural network 166, and the fourth local neural network 168 may be trained (e.g., in parallel and/or in sequence).

The machine learning controller 130 may transform training data to conform to the resource constraint of the platform (404). For example, the machine learning controller 130 (e.g., the data transformer 212) may preprocess training data to at least reduce the dimensionality of the training data to conform to the resource constraints (e.g., memory, processor, bandwidth, and/or the like) of the first client device 140. In some example embodiments, the preprocessing of the training data may include factoring high-dimensional training data (e.g., a data matrix $A_{m \times n}$) into a product of a dictionary (e.g., a dictionary matrix $D_{m \times l}$) and a lower dimensional encoding (e.g., an coefficient matrix $C_{l \times n}$).

The machine learning controller 130 may train the global machine learning model by at least processing, at the platform, the transformed training data with a first of the plurality of local machine learning models (406). For instance, the machine learning controller 130 (e.g., the operations coordinator 214) may train the global neural network 150 by at least individually training the first local neural network 162, the second local neural network 164, the third local neural network 166, and/or the fourth local neural network 168. Training each of the first local neural network 162, the second local neural network 164, the third local neural network 166, and/or the fourth local neural network 168 may include processing the preprocessed training data (e.g., the encodings) with each of the first local neural network 162, the second local neural network 164, the third local neural network 166, and/or the fourth local neural network 168. It should be appreciated that depending on the available resource at the first client device 140, the machine learning controller 130 (e.g., the operations coordinator 214) may train one or more of the first local neural network 162, the second local neural network 164, the third local neural network 166, and/or the fourth local neural network 168 in parallel and/or in sequence.

The machine learning controller 130 may update a parameter at the global machine learning model based at least on a corresponding parameter at the first local machine learning model (408). For example, training the first local neural network 162, the second local neural network 164, the third local neural network 166, and/or the fourth local neural network 168 may include adjusting the parameters applied at the first local neural network 162, the second local neural network 164, the third local neural network 166, and/or the fourth local neural network 168. Thus, in some example embodiments, the machine learning controller 130 (e.g., the operations coordinator 214) may propagate these changes to the corresponding parameters (e.g., weights, biases, and/or the like) at the global neural network 150.

The machine learning controller 130 may determine whether the training of the global machine learning model meet one or more criteria (409). For example, the machine learning controller 130 (e.g., the operations coordinator 214) may determine, based on an error function associated with the global neural network 150, whether the global neural network 150 has achieved convergence. The global neural network 150 may achieve convergence when the error function is at a minima (e.g., stops decreasing). Alternately and/or additionally, the machine learning controller 130 may determine whether the global neural network 150 has been subject to a threshold number of training iterations.

The machine learning controller 130 may determine that the training of the global machine learning model does not meet the one or more criteria (409-N). For example, the machine learning controller 130 (e.g., the operations coordinator 214) may determine that the global neural network 150 has not achieved convergence and/or that the global neural network 150 has not been subject to a threshold number of training iterations. As such, the machine learning controller 130 may continue training the global machine learning model (410). For instance, the machine learning controller 130 (e.g., the operations coordinator 214) may continue training the global neural network 150 by at least processing the same and/or additional preprocessed training data with the first local neural network 162, the second local neural network 164, the third local neural network 166, and/or the fourth local neural network 168 (e.g., in parallel and/or in sequence).

Alternately and/or additionally, the process 400 may terminate, when the machine learning controller 130 may determine that the training of the global machine learning model meet the one or more criteria (409-Y). For example, the machine learning controller 130 may cease the training of the global neural network 150 when the global neural network 150 achieves convergence and/or when the global neural network 150 has been subject to a threshold number of training iterations. In some example embodiments, the trained global neural network 150 may be executed to perform a variety of cognitive tasks including, for example, object identification, natural language processing, information retrieval, and speech recognition.

Figure 4B:
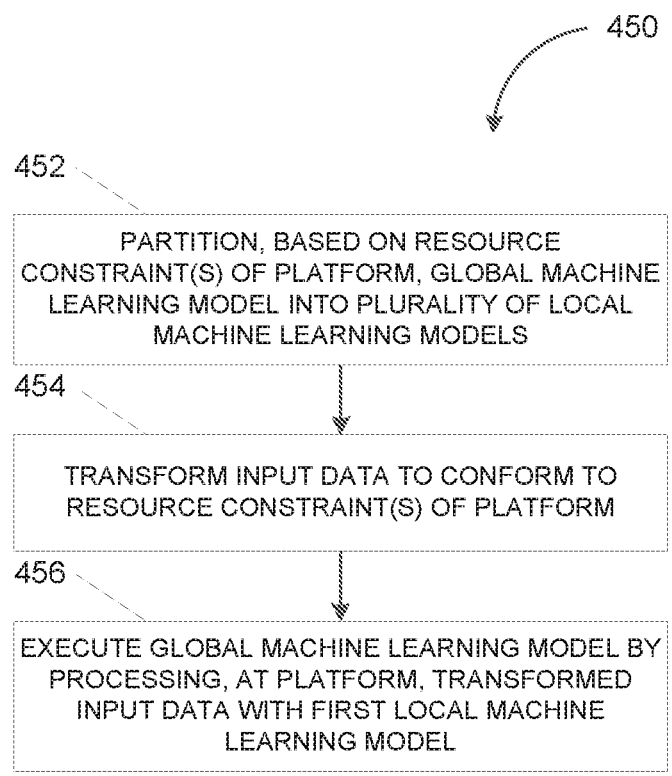
FIG. 4B depicts a flowchart illustrating a process for executing a global machine learning model, in accordance with some example embodiments.

FIG. 4B depicts a flowchart illustrating a process 450 for executing a global machine learning model, in accordance with some example embodiments. Referring to FIGS. 1A-C, 2, 3A-B, and 4B, the process 450 may be performed by the machine learning controller 130. In some example embodiments, the process 450 may be performed to execute a global machine learning model that has been trained via the process 400.

The machine learning controller 130 may partition, based at least on a resource constraint of a platform, a global machine learning model into a plurality of local machine learning models (452). For example, the resources (e.g., memory, processor, bandwidth, and/or the like) available at the first client device 140 may not be sufficient to support the execution of the global neural network 150. Thus, in some example embodiments, the machine learning controller 130 (e.g., the partition generator 210) may partition the global neural network 150 into the first local neural network 162, the second local neural network 164, the third local neural network 166, and/or the fourth local neural network 168. The machine learning controller 130 may partition the global neural network 150 in accordance with the resource constraints (e.g., memory, processor, bandwidth, and/or the like) of the first client device 140, with each of the first local neural network 162, the second local neural network 164, the third local neural network 166, and/or the fourth local neural network 168 having a portion (e.g., overlapping subset) of the neurons and interconnections present in the global neural network 150. In doing so, the first client device 140 may have sufficient resources to execute one or more of the first local neural network 162, the second local neural network 164, the third local neural network 166, and the fourth local neural network 168 may be trained (e.g., in parallel and/or in sequence).

The machine learning controller 130 may transform input data to conform to the resource constraint of the platform (454). For example, the machine learning controller 130 (e.g., the data transformer 212) may preprocess input data to at least reduce the dimensionality of the input data to conform to the resource constraints (e.g., memory, processor, bandwidth, and/or the like) of the first client device 140. In some example embodiments, the preprocessing of the input data may include factoring high-dimensional input data (e.g., a data matrix $A_{m \times n}$) into a product of a dictionary (e.g., a dictionary matrix $D_{m \times l}$) and a lower dimensional encoding (e.g., an coefficient matrix $C_{l \times n}$).

The machine learning controller 130 may execute the global machine learning model by at least processing the transformed input data with a first of the plurality of local machine learning model (456). For instance, the machine learning controller 130 (e.g., the operations coordinator 214) may execute the global neural network 150 by at least individually executing the first local neural network 162, the second local neural network 164, the third local neural network 166, and/or the fourth local neural network 168. Executing each of the first local neural network 162, the second local neural network 164, the third local neural network 166, and/or the fourth local neural network 168 may include processing the preprocessed input data (e.g., the encodings) with each of the first local neural network 162, the second local neural network 164, the third local neural network 166, and/or the fourth local neural network 168. It should be appreciated that depending on the available resource at the first client device 140, the machine learning controller 130 (e.g., the operations coordinator 214) may execute one or more of the first local neural network 162, the second local neural network 164, the third local neural network 166, and/or the fourth local neural network 168 in parallel and/or in sequence.

Figure 5:
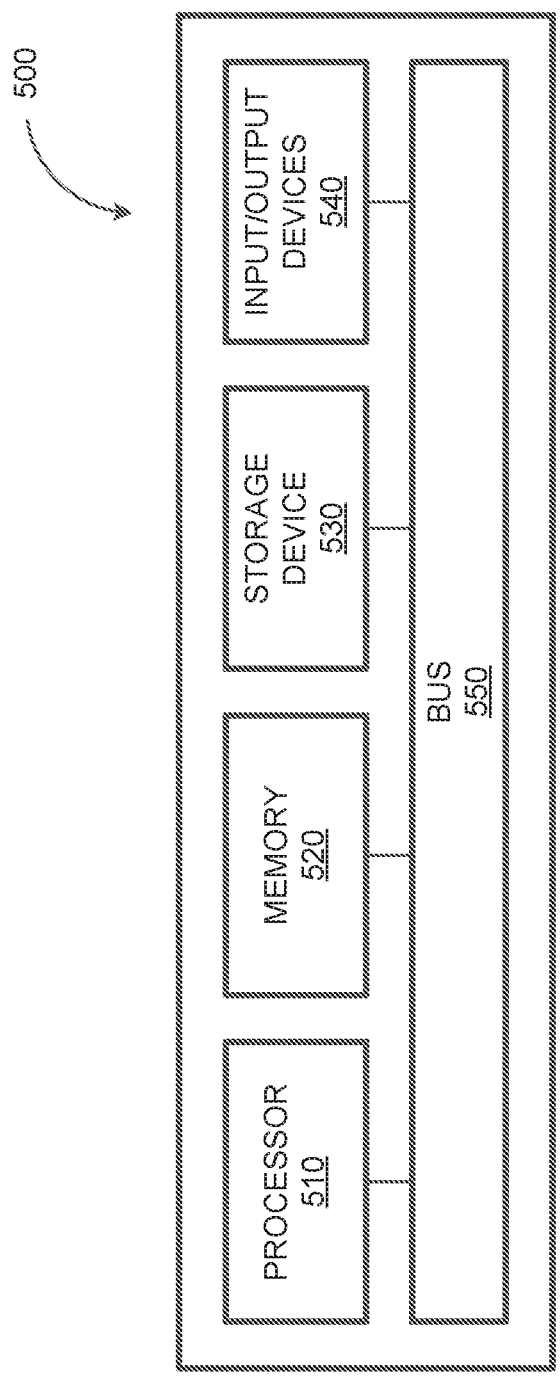
FIG. 5 depicts a block diagram illustrating a computing system, in accordance with some example embodiments.

FIG. 5 depicts a block diagram illustrating a computing system 500, in accordance with some example embodiments. Referring to FIGS. 1 and 5, the computing system 500 can be used to implement the global machine learning engine 110, the machine learning controller 130, the first client device 140, and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the global machine learning engine 110, the machine learning controller 130, and/or the first client device 140. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one processor; and
   at least one memory including program code which when executed by the at least one processor provides operations comprising:
      partitioning, based at least on a resource constraint of a platform, a global machine learning model into a plurality of local machine learning models, each local machine learning model of the plurality of local machine learning models having a subset of a plurality of neurons and interconnections included in the global machine learning model, the global machine learning model being subjected to a depth first partitioning such that each local machine learning model of the plurality of local machine learning models include a same quantity of layers as the global machine learning models, and each local machine learning model of the plurality of local machine learning models having an output layer with a same quantity of neurons as an output layer of the global machine learning model;
      transforming training data to at least conform to the resource constraint of the platform; and
      training the global machine learning model by at least processing, at the platform, the transformed training data with a first local machine learning model of the plurality of local machine learning models, wherein training the global machine learning model further comprises updating a parameter of the global machine learning model based on at least one corresponding parameter from the plurality of local machine learning models after the transforming of training data.

2. The system of claim 1, further comprising:
   backward propagating an error in an output of the processing of the transformed training data with the first local machine learning model, the error being backward propagated through the first local machine learning model;
   minimizing the error by at least adjusting a parameter applied by the first local machine learning model;
   updating, based at least on the adjusting of the parameter at the first local machine learning model, a corresponding parameter at the global machine learning model; and
   adjusting a frequency of updating the corresponding parameter at the global machine learning model, the adjusting of the frequency being based at least on a communication cost of the updating and a computation cost of having a stale parameter at the global machine learning model.

3. The system of claim 1, wherein the transforming of the training data comprises reducing a dimensionality of the training data, wherein the reducing of the dimensionality of the training data comprises factorizing the training data into a corresponding dictionary and a plurality of encodings, the plurality of encodings having a lower dimension than the training data, wherein the training of the global machine learning model further comprises processing a first of the plurality of encodings and a second of the plurality of encodings, and wherein the first encoding is processed in parallel with the second encoding, when the resource constraint of the platform enables the first encoding to be processed in parallel at the platform with the second encoding.

4. The system of claim 1, wherein the training of the global machine learning model further comprises processing the transformed training data with a second of the plurality of local machine learning models.

5. The system of claim 4, wherein the transformed training data is processed, at the platform, with the first local machine learning model and with the second local machine learning model in parallel, when the resource constraint of the platform enables the transformed training data to be processed in parallel at the platform with the first local machine learning model and with the second local machine learning model.

6. The system of claim 4, wherein the transformed training data is processed with the first local machine learning model at the platform, wherein the transformed training data is processed with the second local machine learning model at another platform, and wherein the transformed training data is processed at the platform and at the other platform in parallel.

7. The system of claim 4, wherein the transformed training data is processed, at the platform, with the first local machine learning model and with the second local machine learning model in sequence, when the resource constraint of the platform enables the transformed training data to be processed sequentially at the platform with the first local machine learning model and with the second local machine learning model.

8. The system of claim 1, further comprising:
determining whether the global machine learning model has achieved convergence; and
continuing to train the global machine learning model, when the global machine learning is determined to not have achieved convergence.

9. The system of claim 1, further comprising:
determining whether the global machine learning model has been subject to a threshold number of training iterations; and
continuing to train the global machine learning model, when the global machine learning model is determined to not have been subject to the threshold number of training iterations.

10. The system of claim 1, wherein the global machine learning model comprises a first neural network that is subjected to the depth first partitioning to form, for each local machine learning model of the plurality of local machine learning models, a second neural network having a fewer quantity of neurons and interconnections than the first neural network but the same quantity of layers as the first neural network, and wherein the depth first partitioning of the first neural network enables the second neural network comprising each local machine learning model to be subjected to multiple training iterations prior to updating the first neural network comprising the global machine learning model.

11. A computer-implemented method, comprising:
partitioning, based at least on a resource constraint of a platform, a global machine learning model into a plurality of local machine learning models, each local machine learning model of the plurality of local machine learning models having a subset of a plurality of neurons and interconnections included in the global machine learning model, the global machine learning model being subjected to a depth first partitioning such that each local machine learning model of the plurality of local machine learning models include a same quantity of layers as the global machine learning models, and each local machine learning model of the plurality of local machine learning models having an output layer with a same quantity of neurons as an output layer of the global machine learning model;
transforming training data to at least conform to the resource constraint of the platform; and
training the global machine learning model by at least processing, at the platform, the transformed training data with a first local machine learning model of the plurality of local machine learning models, wherein training the global machine learning model further comprises updating a parameter of the global machine learning model based on at least one corresponding parameter from the plurality of local machine learning models after the transforming of training data.

12. The computer-implemented method of claim 11, further comprising:
backward propagating an error in an output of the processing of the transformed training data with the first local machine learning model, the error being backward propagated through the first local machine learning model;
minimizing the error by at least adjusting a parameter applied by the first local machine learning model;
updating, based at least on the adjusting of the parameter at the first local machine learning model, a corresponding parameter at the global machine learning model; and
adjusting a frequency of updating the corresponding parameter at the global machine learning model, the adjusting of the frequency being based at least on a communication cost of the updating and a computation cost of having a stale parameter at the global machine learning model.

13. The computer-implemented method of claim 11, wherein the transforming of the training data comprises reducing a dimensionality of the training data, wherein the reducing of the dimensionality of the training data comprises factorizing the training data into a corresponding dictionary and a plurality of encodings, the plurality of encodings having a lower dimension than the training data, and wherein a first encoding is processed in parallel with a second encoding, when the resource constraint of the platform enables the first encoding to be processed in parallel at the platform with the second encoding.

14. The computer-implemented method of claim 11, wherein the training of the global machine learning model further comprises processing the transformed training data with a second of the plurality of local machine learning models.

15. The computer-implemented method of claim 14, wherein the transformed training data is processed, at the platform, with the first local machine learning model and with the second local machine learning model in parallel, when the resource constraint of the platform enables the transformed training data to be processed in parallel at the platform with the first local machine learning model and with the second local machine learning model.

16. The computer-implemented method of claim 14, wherein the transformed training data is processed with the first local machine learning model at the platform, wherein the transformed training data is processed with the second local machine learning model at another platform, and wherein the transformed training data is processed at the platform and at the other platform in parallel.

17. The computer-implemented method of claim 14, wherein the transformed training data is processed with the first local machine learning model and with the second local machine learning model in sequence, when the resource constraint of the platform enables the transformed training data to be processed sequentially at the platform with the first local machine learning model and with the second local machine learning model.

18. The computer-implemented method of claim 11, further comprising:
determining whether the global machine learning model has achieved convergence and/or been subject to a threshold number of training iterations; and
continuing to train the global machine learning model, when the global machine learning is determined to not have achieved convergence and/or not have been subject to the threshold number of training iterations.

19. The computer-implemented method of claim 11, wherein the global machine learning model comprises a first neural network that is subjected to the depth first partitioning to form, for each local machine learning model of the plurality of local machine learning models, a second neural network having a fewer quantity of neurons and interconnections than the first neural network but the same quantity of layers as the first neural network, and wherein the depth first partitioning of the first neural network enables the second neural network comprising each local machine learning model to be subjected to multiple training iterations prior to updating the first neural network comprising the global machine learning model.

20. A non-transitory computer-readable storage medium including program code, which when executed by at least one data processor, causes operations comprising:

partitioning, based at least on a resource constraint of a platform, a global machine learning model into a plurality of local machine learning models, each local machine learning model of the plurality of local machine learning models having a subset of a plurality of neurons and interconnections included in the global machine learning model, the global machine learning model being subjected to a depth first partitioning such that each local machine learning model of the plurality of local machine learning models include a same quantity of layers as the global machine learning models, and each local machine learning model of the plurality of local machine learning models having an output layer with a same quantity of neurons as an output layer of the global machine learning model;

transforming training data to at least conform to the resource constraint of the platform; and training the global machine learning model by at least processing, at the platform, the transformed training data with a first local machine learning model of the plurality of local machine learning models, wherein training the global machine learning model further comprises updating a parameter of the global machine learning model based on at least one corresponding parameter from the plurality of local machine learning models after the transforming of training data.

* * * * *